United States Patent
Fu et al.

(10) Patent No.: US 8,265,435 B2
(45) Date of Patent: Sep. 11, 2012

(54) OPTICAL FIBER COUPLING SYSTEMS AND METHODS FOR FABRICATING THE SAME

(75) Inventors: Kai-Mei Camilla Fu, Palo Alto, CA (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 12/696,330

(22) Filed: Jan. 29, 2010

(65) Prior Publication Data

US 2011/0188805 A1    Aug. 4, 2011

(51) Int. Cl.
*G02B 6/34* (2006.01)
(52) U.S. Cl. ............ 385/37; 385/38; 156/60; 156/272.2; 427/162
(58) Field of Classification Search .................... 385/31, 385/37, 38; 156/60, 272.2; 427/162
See application file for complete search history.

(56) References Cited

U.S. PATENT DOCUMENTS

| 5,677,920 | A  | * | 10/1997 | Waarts et al. ..................... 372/6 |
| 6,744,941 | B2 | * | 6/2004  | Khalfallah et al. ............. 385/14 |
| 6,798,960 | B2 | * | 9/2004  | Hamada ........................ 385/122 |
| 7,633,621 | B2 | * | 12/2009 | Thornton ...................... 356/432 |
| 8,160,406 | B2 | * | 4/2012  | Kilic et al. ..................... 385/12 |
| 2002/0159487 | A1 | * | 10/2002 | Thornton et al. ............... 372/26 |
| 2003/0002545 | A1 | * | 1/2003  | Jiang et al. ..................... 372/20 |

* cited by examiner

*Primary Examiner* — Ellen Kim

(57) ABSTRACT

Various embodiments of the present invention are directed to optical fiber coupling systems and to methods for fabricating optical fiber coupling systems. In one aspect, an optical fiber coupling system includes a first resonant cavity abutting the end of an optical fiber. The optical fiber coupling system includes a second resonant cavity located adjacent to the first cavity. The first and second resonant cavities are separated by a sub-wavelength grating layer configured with a non-periodic sub-wavelength grating. The optical fiber coupling system selectively couples light into and/or out of the optical fiber core.

20 Claims, 20 Drawing Sheets

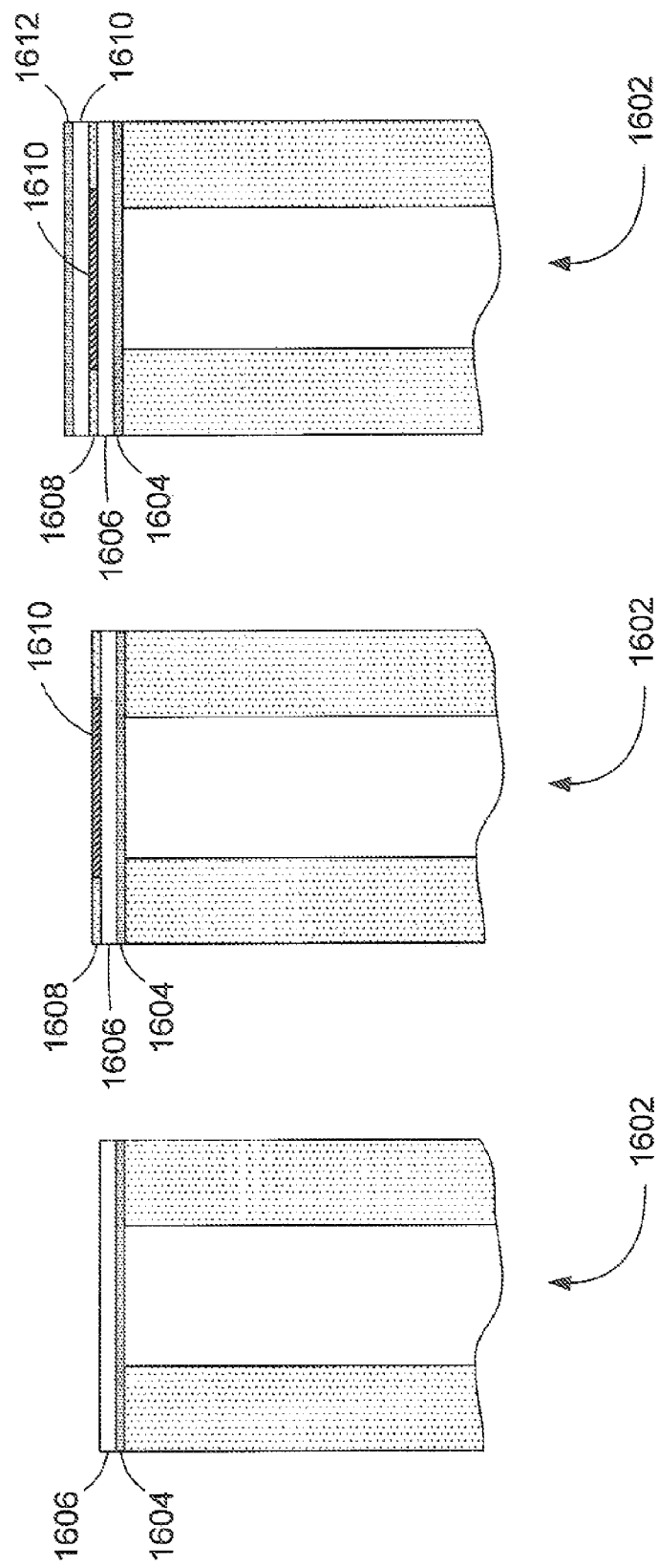

OPTICAL FIBER COUPLING SYSTEMS AND METHODS FOR FABRICATING THE SAME

TECHNICAL FIELD

Embodiments of the present invention relate to optical fibers, optical fiber couplers, and gratings.

BACKGROUND

An optical fiber coupler couples light into and out of an optical fiber and is an indispensable part of any optical communication system. However, coupling light into and out of an optical fiber presents a number of problems. In the case of multimode fibers, a lens must be positioned and configured to focus the light of a well-collimated beam to a spot size that is less than the diameter of the fiber core. In addition, the angle from the lens to the fiber must be less than the numerical aperture ("NA") of the fiber core. In others words, the position and configuration of the lens used to inject light into the core of an optical fiber are selected to ensure that the maximal ray of the focused beam lies within the NA of the fiber core, in this way effective coupling can be accomplished. On the other hand, in order to couple light into a single mode fiber, the mode of the fiber core and the mode of the light must be nearly phase matched. For example, in order to couple light of a wavelength $\lambda$ from a collimated Gaussian laser beam of $1/e^2$ and diameter D into a single-mode fiber with a mode-field diameter d, a lens with a focal length give by:

$$f = D(\pi d/4\lambda)$$

is used. Coupling efficiency depends on the overlap integral of the Gaussian mode of the input laser beam and the nearly Gaussian fundamental mode of the fiber.

However, the lenses typically used to couple light into and out of either single or multimode fibers require a relatively large optical fiber coupler to house and position the lens at a fixed distance from the end of the fiber. In addition, the lens is typically the most expensive component of the optical fiber coupler.

Physicists and engineers continue to seek enhancements that reduce the cost and size of optical fiber couplers.

BRIEF DESCRIPTION OF THE DRAWINGS

FIGS. 16A-16C show steps of a method for fabricating an optical fiber coupler on the end of an optical fiber in accordance with one or more embodiments of the present invention.

DETAILED DESCRIPTION

Various embodiments of the present invention are directed to optical fiber coupling systems and to methods for fabricating optical fiber coupling systems. An optical fiber coupling system includes a non-periodic, sub-wavelength grating separating two resonant cavities. The sub-wavelength grating is configured to control the shape of the phase front of the light transmitted into and/or out of the optical fiber. Embodiments of the present invention also include methods for fabricating optical fiber coupling systems.

In the following description, the term "light" refers to electromagnetic radiation with wavelengths in the visible and non-visible portions of the electromagnetic spectrum, including infrared and ultra-violet portions of the electromagnetic spectrum.

Optical Fiber Coupling Systems

Figure 1A:
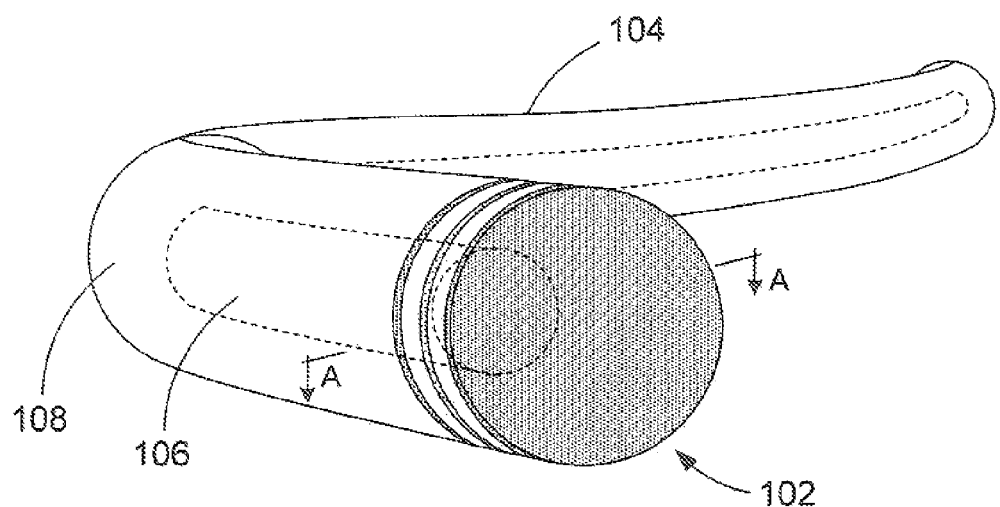
FIG. 1A shows an isometric view of an optical fiber coupler disposed at the end of an optical fiber in accordance with one or more embodiments of the present invention.
Figure 1B:
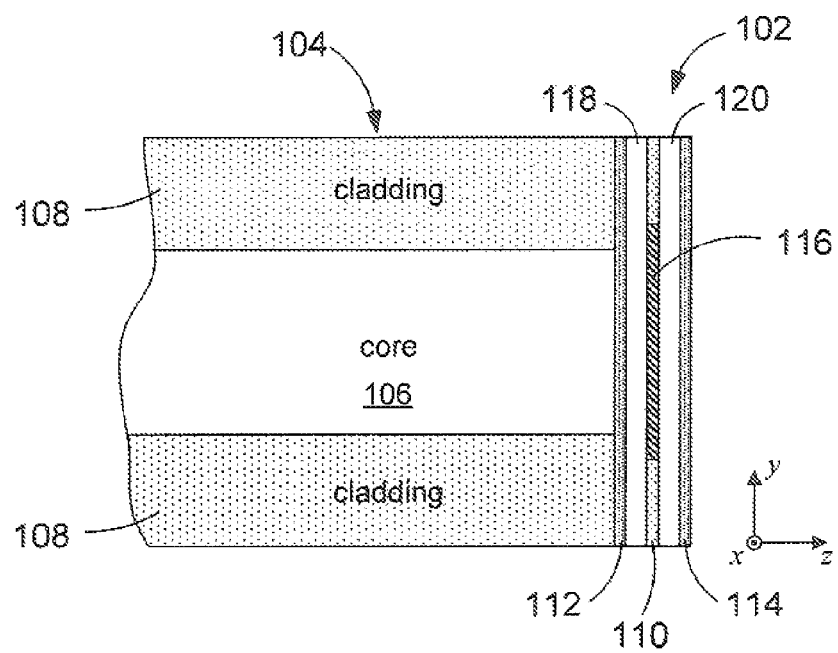
FIG. 1B shows a cross-sectional view of the optical fiber coupler and end portion of the optical fiber along a line A-A, shown in FIG. 1A, in accordance with one or more embodiments of the present invention.

FIG. 1A shows an isometric view of an optical fiber coupling system ("OFC") 102 disposed at the end of an optical fiber 104 in accordance with one or more embodiments of the present invention. As shown in the example of FIG. 1A, the optical fiber 104 includes a core 106 surrounded by a cladding layer 108, the core 106 having a larger refractive index than the cladding layer 108. FIG. 1B shows a cross-sectional view of the OFC 102 and the end portion of the optical fiber 104 along a line A-A, shown in FIG. 1A, in accordance with one or more embodiments of the present invention. As shown in FIG. 1B, the OFC 102 abuts the end of the optical fiber 104 and includes a substantially planar sub-wavelength grating ("SWG") layer 110 disposed between two approximately parallel, substantially planar, reflective layers 112 and 114. The substantially planar SWG layer 110 includes a non-periodic SWG ("NP-SWG") 116, described in greater detail below. Spacer layer 118 separates the SWG layer 110 from the reflective layer 112, and spacer layer 120 separates the SWG layer 110 from the reflective layer 114. The SWG layer 110 and the reflective layer 112 are separated by the lower refractive index spacer layer 118 to form a first resonant cavity, and the SWG layer 110 and the reflective layer 114 are also separated by the spacer layer 120 to form a second resonant cavity, for appropriate modes of incident electromagnetic radiation. In other words, as shown in FIG. 1B, the SWG layer 110 separates the first and second optical cavities and the NP-SWG is configured to control the wavefront shaped of the light transmitted into or out of the optical fiber, as described below.

The SWG layer 110 can be composed of any suitable semiconductor material, such as silicon ("Si"), gallium arsenide ("GaAs"), or indium phosphide ("InP"). The SWG layer 110 can also be composed of a dielectric material, such as silicon carbide ("SiC"). The reflective layers 112 and 114 can be composed of a dielectric material; a semiconductor; or a metal, such as gold ("Au") or silver ("Ag"). The spacer layers 118 and 120 can be composed of a suitable polymer or another dielectric material, the polymer and the dielectric material having a lower refractive index than the layers 110, 112, and 114.

Figure 2:
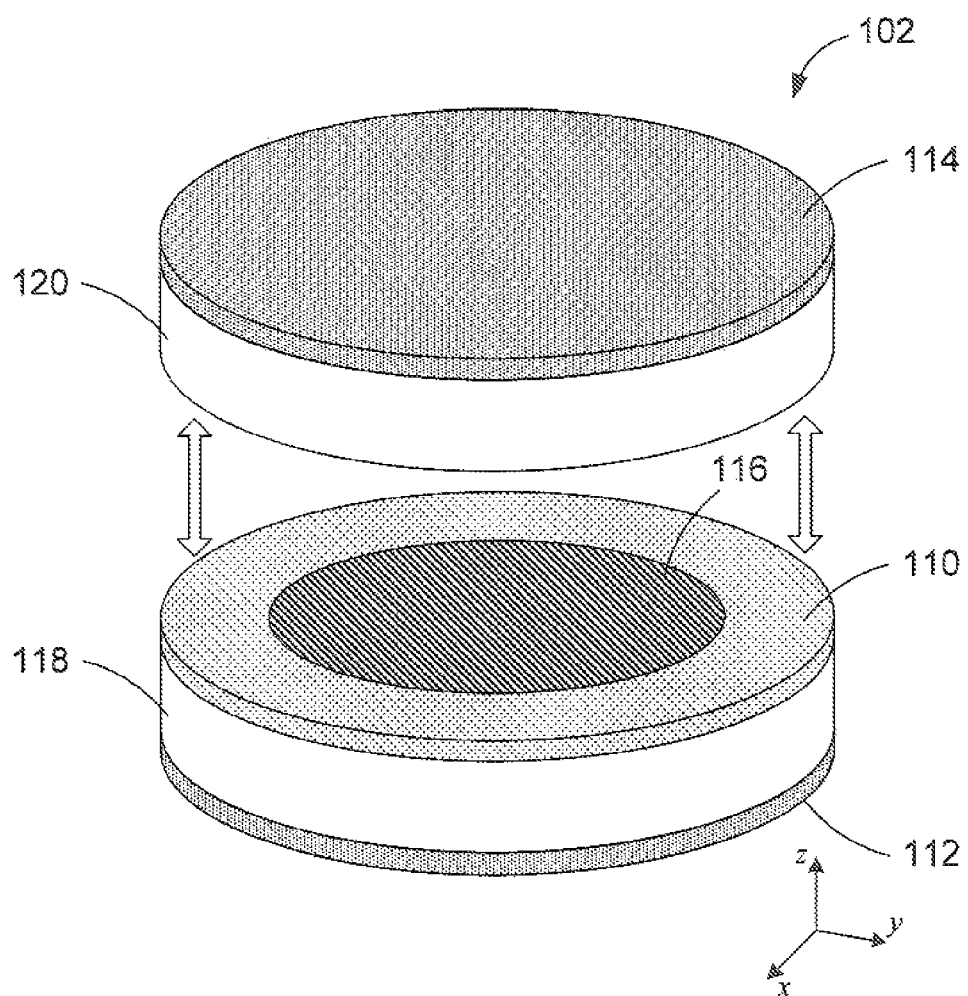
FIG. 2 shows an exploded isometric view of an optical fiber coupler configured in accordance with one or more embodiments of the present invention.

FIG. 2 shows an exploded isometric view of the OFC 102 configured in accordance with one or more embodiments of the present invention. As shown in the example of FIG. 2, separating the layer 120 from the SWG layer 110 reveals the NP-SWG 116 of the SWG layer 110 in accordance with certain embodiments of the present invention. In other embodiments, the entire SWG layer 110 can be configured as an NP-SWG.

Figure 3:
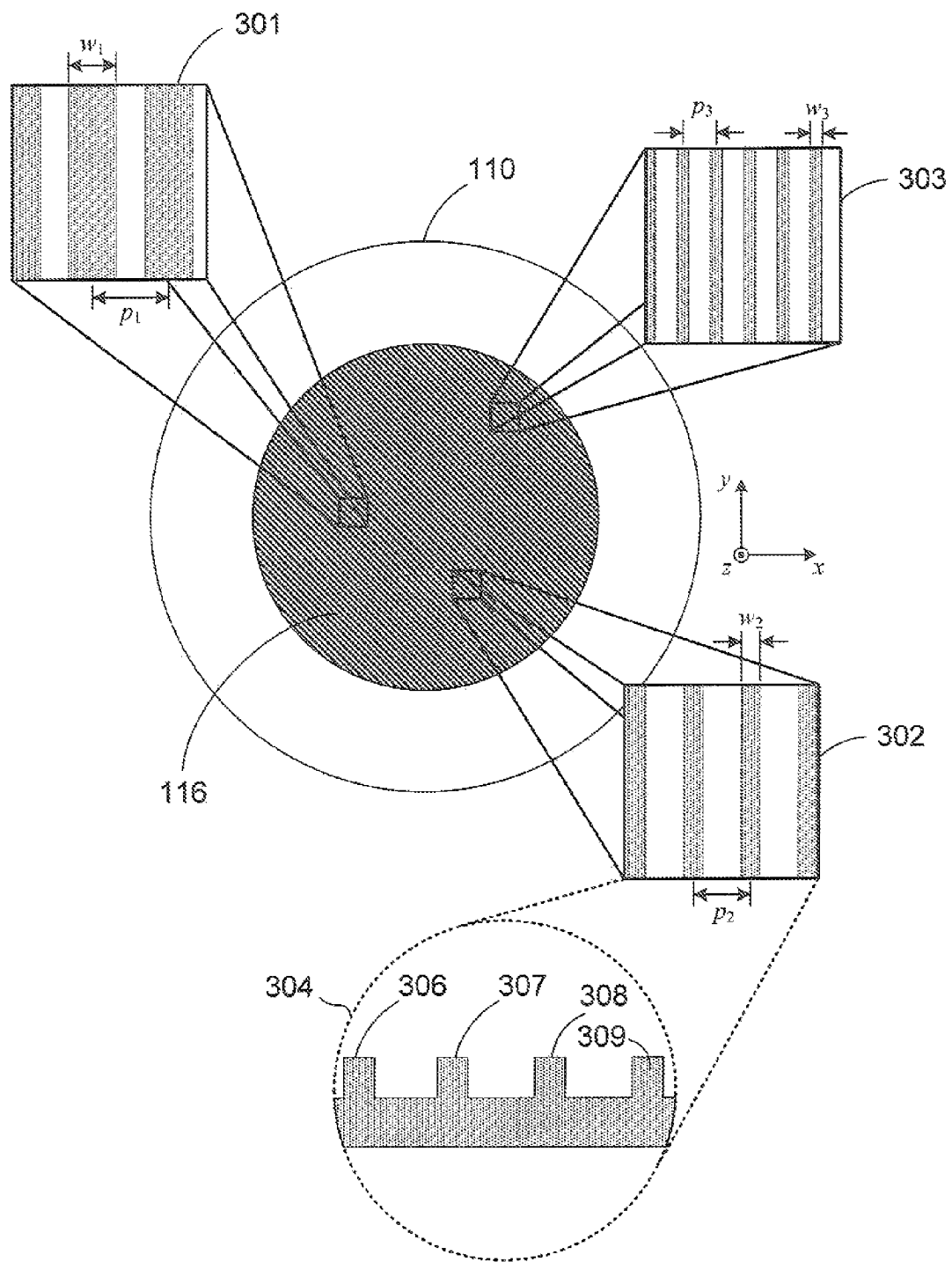
FIG. 3 shows a top plan view of a non-periodic, sub-wavelength grating layer of an optical fiber coupler configured in accordance with embodiments of the present invention.

FIG. 3 shows a top plane view of the SWG layer 110 configured with a one-dimensional grating pattern in accordance with one or more embodiments of the present invention. The one-dimensional grating pattern is composed of a number of one-dimensional grating sub-patterns. In the example of FIG. 3, three exemplary grating sub-patterns 301-303 are enlarged. Each grating sub-pattern comprises a number of regularly spaced wire-like portions of the SWG layer 110 material called "lines." The lines extend in the y-direction and are periodically spaced in the x-direction. FIG. 3 also includes an enlarged end-on view 304 of the grating sub-pattern 302. In end-on view 304, the SWG layer 110 can be a single layer with lines, such as lines 306-309, separated by grooves formed in the layer.

As shown in the example of FIG. 3, each sub-pattern is characterized by a particular periodic spacing of the lines and by the line width in the x-direction. For example, the sub-pattern 301 comprises lines of width $w_1$ periodically spaced with a period $p_1$, the sub-pattern 302 comprises lines with width $w_2$ periodically spaced with a period $p_2$, and the sub-pattern 303 comprises lines with width $w_3$ periodically spaced with a period $p_3$. The grating sub-patterns 301-303 form sub-wavelength gratings that preferentially reflect incident light polarized in one direction, e.g. light polarized in the x direction, provided the periods $p_1$, $p_2$, and $p_3$ are smaller than the wavelength of the incident light. For example, the line widths can range from approximately 10 nm to approximately 300 nm and the periods can range from approximately 20 nm to approximately 1 μm depending on the wavelength of the light incident on the OFC 102. The light reflected from a sub-region acquires a phase $\phi$ determined by the line thickness t, and the duty cycle η defined by:

$$\eta = \frac{w}{p}$$

where w is the line width and p is the period of the lines associated with the region.

Each of the grating sub-patterns 301-303 also reflect incident light polarized in one direction differently due to the different duty cycles and periods associated with each of the sub-patterns. Note the SWG layer 110 can be configured to reflect the x-polarized component or the y-polarized component of the incident light by adjusting the period, line width, and line thickness of the lines. For example, a particular period, line width and thickness may be suitable for reflecting the x-polarized component of light but may not be suitable for reflecting the y-polarized component; and a different period, line width, and line thickness may be suitable for reflecting the y-polarized component but may not be suitable for reflecting the x-polarized component.

Figure 4:
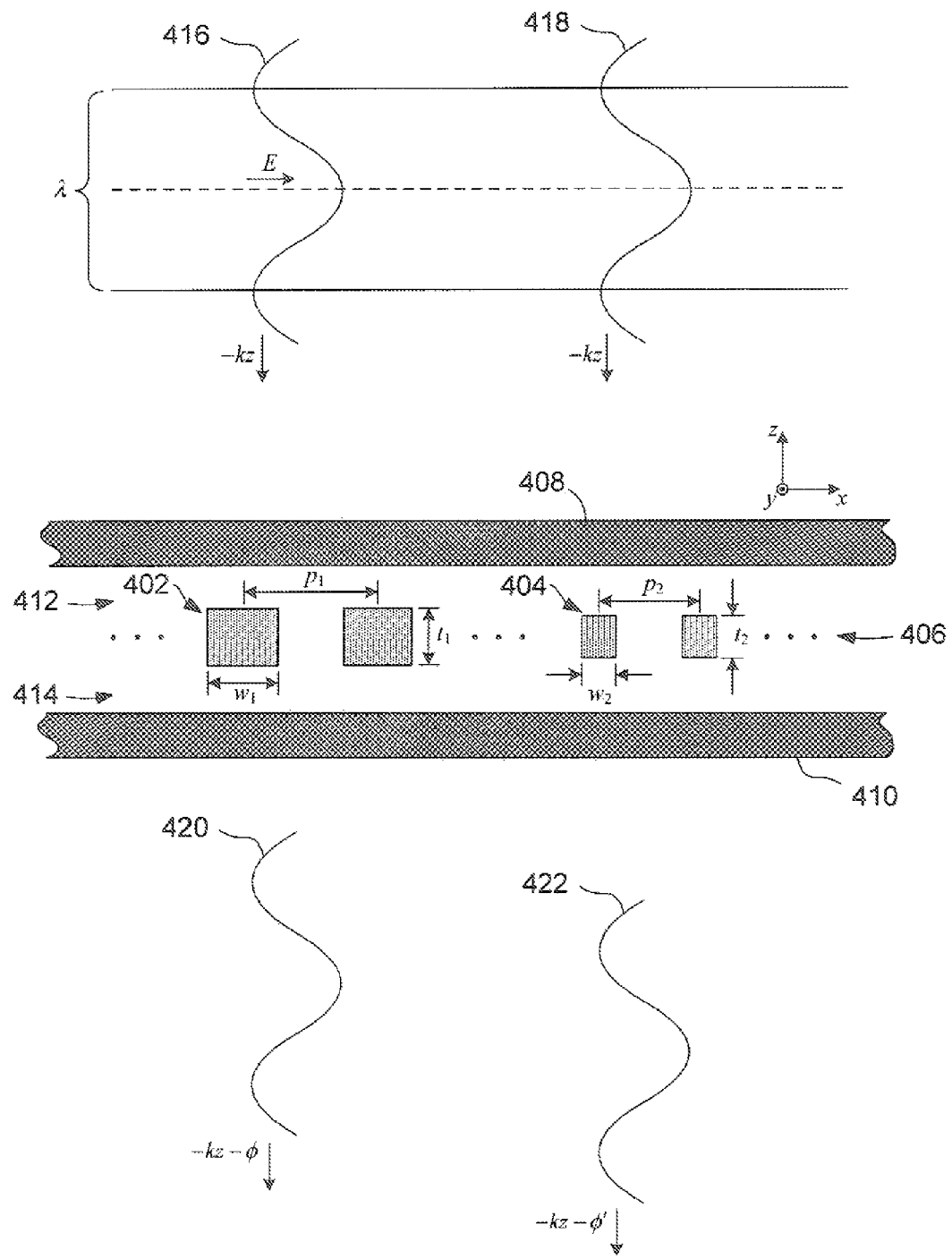
FIG. 4 shows a top plan view of a optical fiber coupler operated in accordance with one or more embodiments of the present invention.

FIG. 4 shows a cross-sectional view of an OFC revealing portions of two separate grating sub-patterns 402 and 404 of a SWG layer 406 disposed between a first reflective layer 408 and a second reflective layer 410 in accordance with embodiments of the present invention. The sub-patterns 402 and 404 can be located in different regions of the SWG layer 406. The thickness $t_1$ of the lines of sub-pattern 402 are greater than the thickness $t_2$ of the lines of sub-pattern 404, and the duty cycle $\eta_1$ associated with the lines in sub-pattern 402 is greater than the duty cycle $\eta_2$ associated with the lines of sub-pattern 404. Light polarized in the x-direction and incident on the OFC becomes trapped and oscillates for a period of time within the resonant cavities 412 and 414. The light is ultimately transmitted through the layers 406, 408, and 410, but with the portion of light transmitted through the sub-region 402 acquiring a larger phase shift than the portion of light transmitted through the sub-region 404. As shown in the example of FIG. 4, the incident waves 416 and 418 strike the OFC with approximately the same phase, but the wave 420 transmitted through the sub-pattern 402 acquires a relatively larger phase shift $\phi$ than the phase shift $\phi'$ (i.e., $\phi > \phi'$) acquired by the wave 422 transmitted through the sub-pattern 404.

Figure 5:
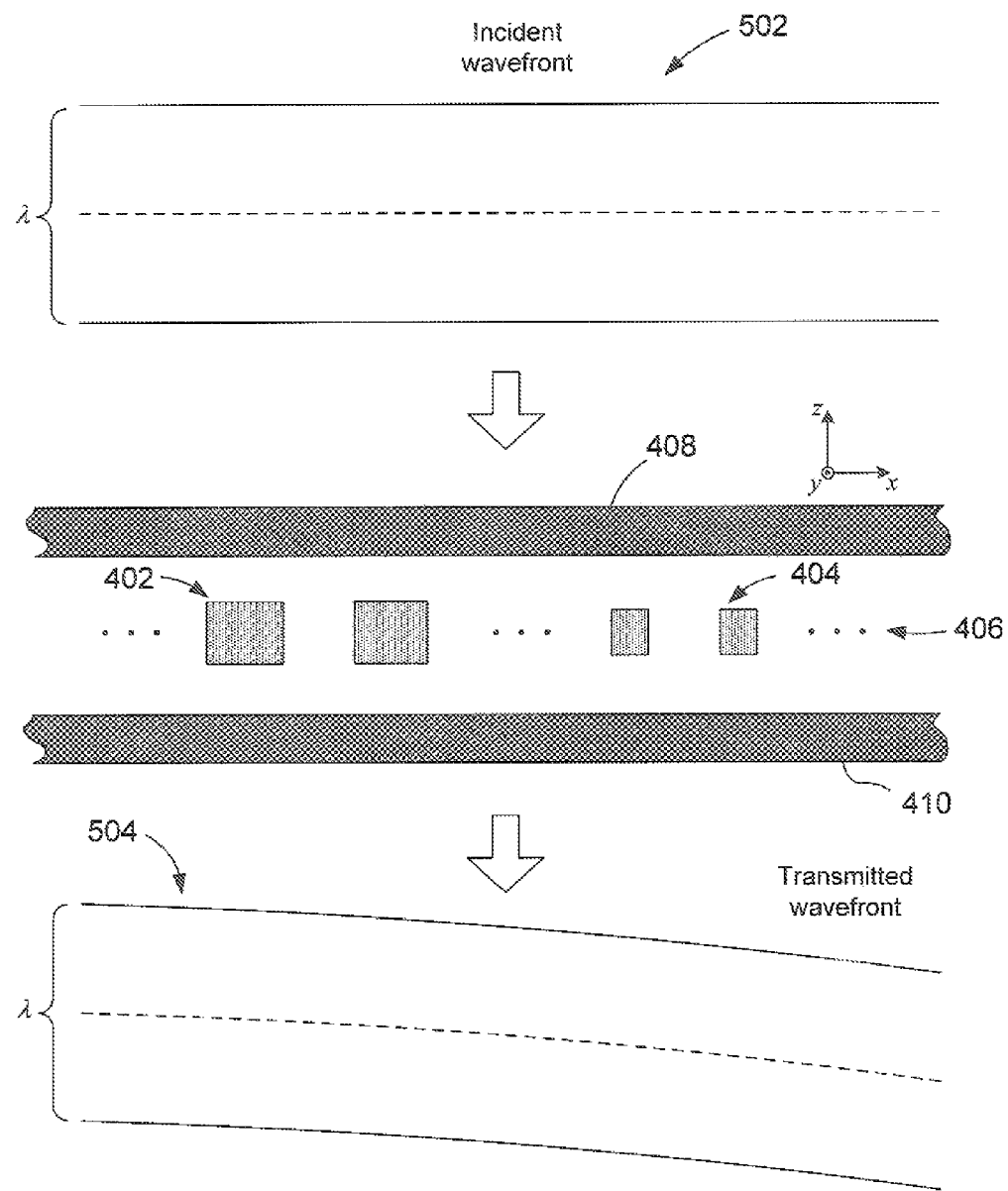
FIG. 5 shows a top plan view of a optical fiber coupler operated in accordance with one or more embodiments of the present invention.

FIG. 5 shows a cross-sectional view of an OFC revealing how a transmitted wavefront can be changed in accordance with one or more embodiments of the present invention. As shown in the example of FIG. 5, incident light with a substantially uniform wavefront 502 strikes the OFC producing transmitted light with a curved transmitted wavefront 504. The transmitted wavefront 504 results from portions of the incident wavefront 502 interacting with the sub-region 402 with a relatively larger duty cycle $\eta_1$ and thickness $t_1$ than portions of the same incident wavefront 502 interacting with the sub-region 404 with a relatively smaller duty cycle $\eta_2$ and thickness $t_2$. The shape of the transmitted wavefront 504 is consistent with the larger phase acquired by light interacting with sub-region 402 relative to the smaller phase shift acquired by light interacting with the sub-region 404.

OFCs of the present invention can be configured to apply a particular phase change to transmitted light. In particular, the SWG layer 110 can be configured with a one-dimensional grating pattern to apply a phase change to transmitted light polarized substantially perpendicular to the lines, as described above with reference to FIGS. 3-5.

Figure 6:
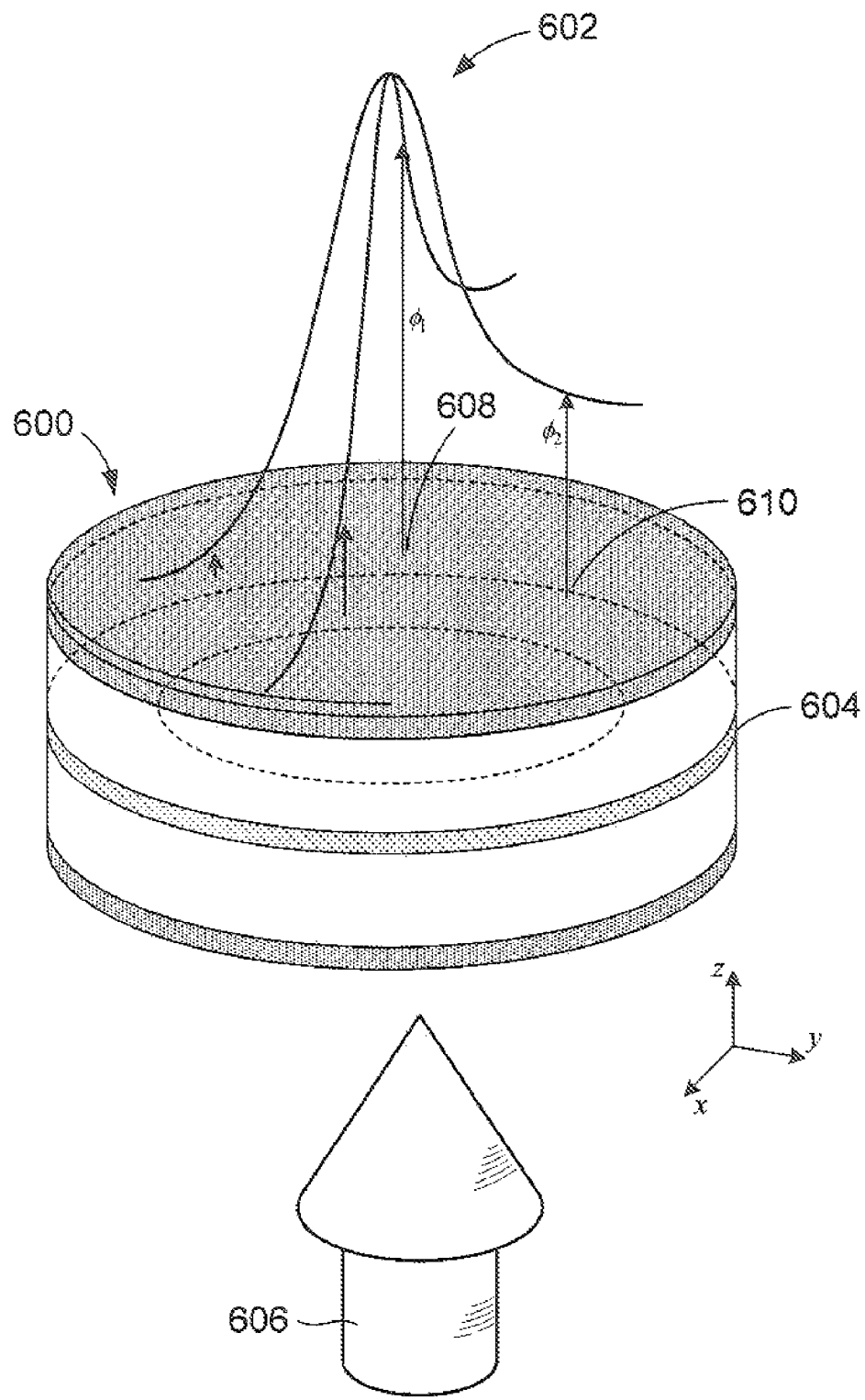
FIG. 6 shows an isometric view of an exemplary phase contour map produced by an example optical fiber coupler configured in accordance with one or more embodiments of the present invention.

FIG. 6 shows an isometric view of an exemplary phase change contour map 602 produced by a particular grating pattern of a SWG layer 604 of an OFC 600 in accordance with one or more embodiments of the present invention. The contour map 602 represents an example of the magnitude of the phase change acquired by light 606 transmitted through the OFC 600. In the example shown in FIG. 6, the grating pattern in the SWG layer 604 produces a phase contour map 602 with the smallest magnitude in the phase acquired by transmitted light occurring near the center of the OFC 600. The magnitude of the phase acquired by transmitted light decreases away from the center of the OFC 600. For example, light transmitted near the center 608 of the OFC 600 acquires a phase of $\phi_1$, and light transmitted through the region 610 acquires a phase of $\phi_2$. Because $\phi_1$ is much larger than $\phi_2$, the light transmitted through the center 608 acquires a much larger phase than the light transmitted through the region 610.

The phase change in turn shapes the wavefront of light transmitted through the OFC. For example, as described above with reference to FIG. 4, lines having a relatively larger duty cycle produce a larger phase shift in transmitted light than lines having a relatively smaller duty cycle. As a result, a first portion of a wavefront transmitted through a region of an OFC with sub-pattern lines having a first duty cycle lags behind a second portion of the same wavefront transmitted through a different portion of the OFC with sub-pattern lines having a second relatively smaller duty cycle. Embodiments of the present invention include patterning the SWG layer to control the phase change and ultimately the shape of the transmitted wavefront so that the OFC can be operated with particular optical properties.

Figure 7B:
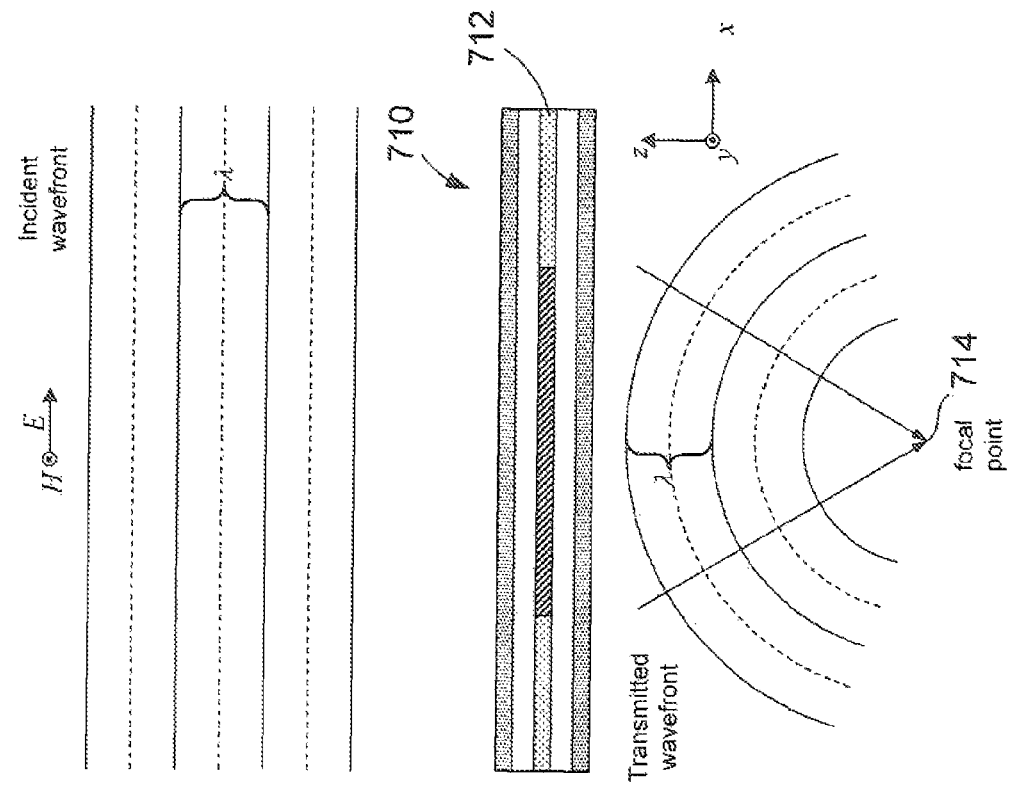
FIG. 7B shows a cross-sectional view of an optical fiber coupler configured to focus light onto a focal point in accordance with embodiments of the present invention.
Figure 7A:
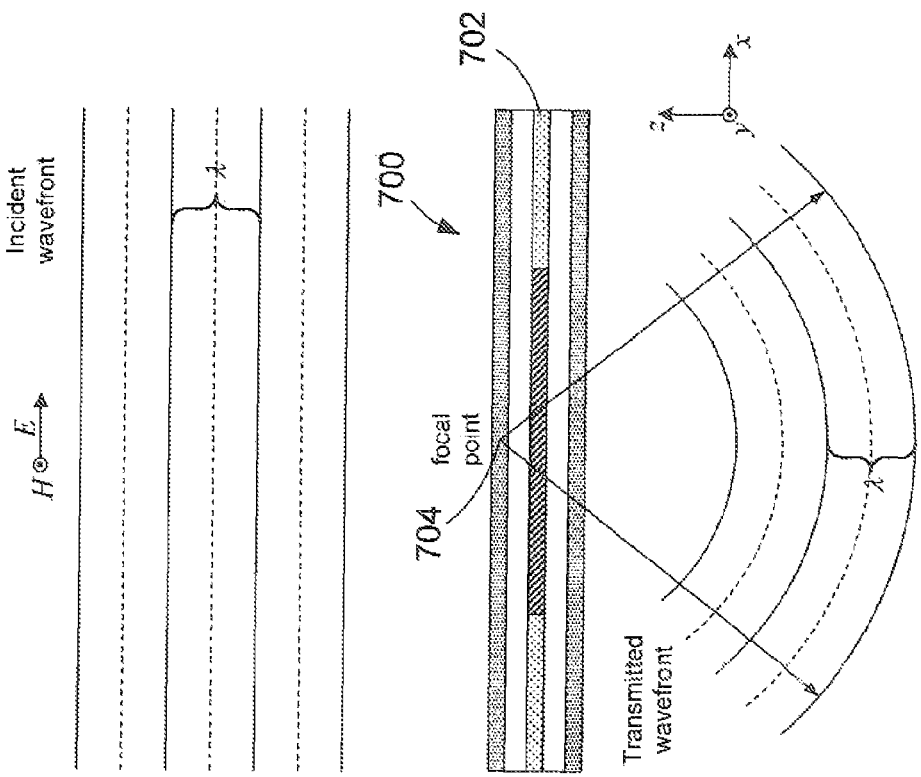
FIG. 7A shows a cross-sectional view of an optical fiber coupler configured to produce divergent light in accordance with embodiments of the present invention.

FIG. 7A shows a cross-sectional view of an OFC 700 with a SWG layer 702 configured to diverge light as if the light emanated from a focal point 704 in accordance with one or more embodiments of the present invention. In the example of FIG. 7A, the SWG of the SWG layer 702 is configured with a non-periodic grating pattern that causes incident light polarized in the x-direction to be transmitted with a wavefront corresponding to the transmitted light diverging from the focal point 704. On the other hand, FIG. 7B shows a cross-sectional view of an OFC 710 with a SWG layer 712 configured to focus light onto a focal point 714 in accordance with one or more embodiments of the present invention. In the example of FIG. 7B, the SWG of the SWG layer 712 is configured with a non-periodic grating pattern that causes incident light polarized in the x-direction to be transmitted with a wavefront corresponding to light directed to the focal point 714.

Figure 8A:
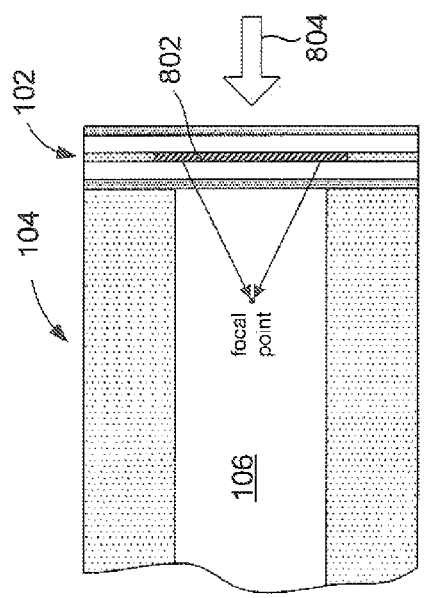
FIGS. 8A-8D show cross-sections views of example optical fiber couplers configured to control coupling of light into and out of optical fibers in accordance with embodiments of the present invention.
Figure 8B:
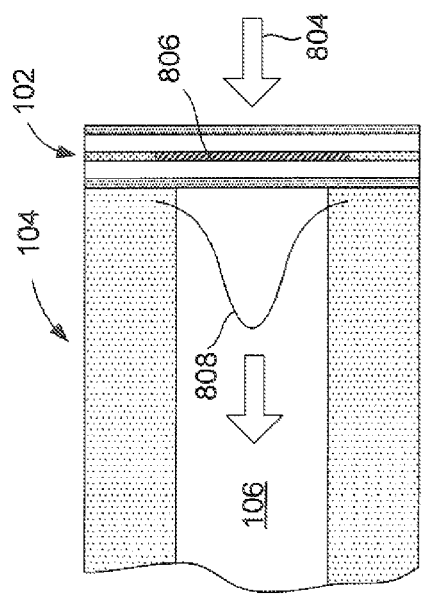
Figure 8C:
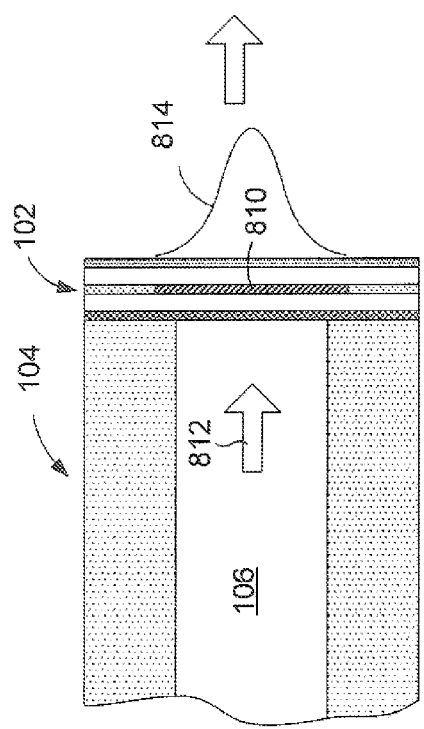
Figure 8D:
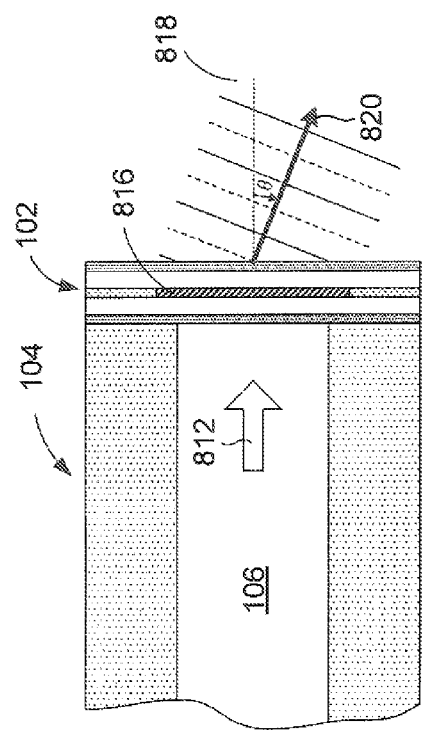

FIGS. 8A-8C show cross-sectional views of example OFCs configured to control coupling of light into and out of optical fibers in accordance with embodiments of the present invention. The OFCs shown in FIGS. 8A-8C are configured with SWG layers, reflective layers, and spacer layers as described above with reference to FIG. 1. However, it is the configuration of the NP-SWG of the SWG layer 110 that determines how light is coupled into and out of an optical fiber. In the example of FIG. 8A, the optical fiber 104 can be a multimode fiber and NP-SWG 802 of SWG layer 110 is configured to focus incident light 804 onto a focal point in the core 106 of the optical fiber 104. In the example of FIG. 8B, the optical fiber 104 can represent a single mode fiber and NP-SWG 806 of SWG layer 110 is configured so that the mode of the light transmitted into the core nearly matches the mode of the fiber core. NP-SWGs 802 and 806 are configured to shape the wavefront of the light to enter the core of the fiber. For example, curve 808 represent a Gaussian-shaped wavefront that corresponds to focusing the incident light into the core 106. The NP-SWG of the SWG layer 110 can also be configured to control the shape and direction of the light exiting the core of the optical fiber. In the example of FIG. 8C, NP-SWG 810 is configured to shape the wavefront of the light 812 exiting the core 106 into a Gaussian-shaped wavefront represented by curve 814. In other words, the NP-SWG 810 can be configured to focus the light 812 exiting the core 106 to a focal point located outside the optical fiber. In the example of FIG. 8D, NP-SWG 816 is configured to direct the light 812 exiting the core 106 into a particular direction. In particular, the OFC 102 is configured to operate like a prism by directing incident light 812 carried by the optical fiber 104 to exit the OFC 102 with a particular angle θ and direction from the surface normal 818, as represented by vector 820.

Configuring Non-Periodic, Sub-Wavelength Gratings

Figure 9:
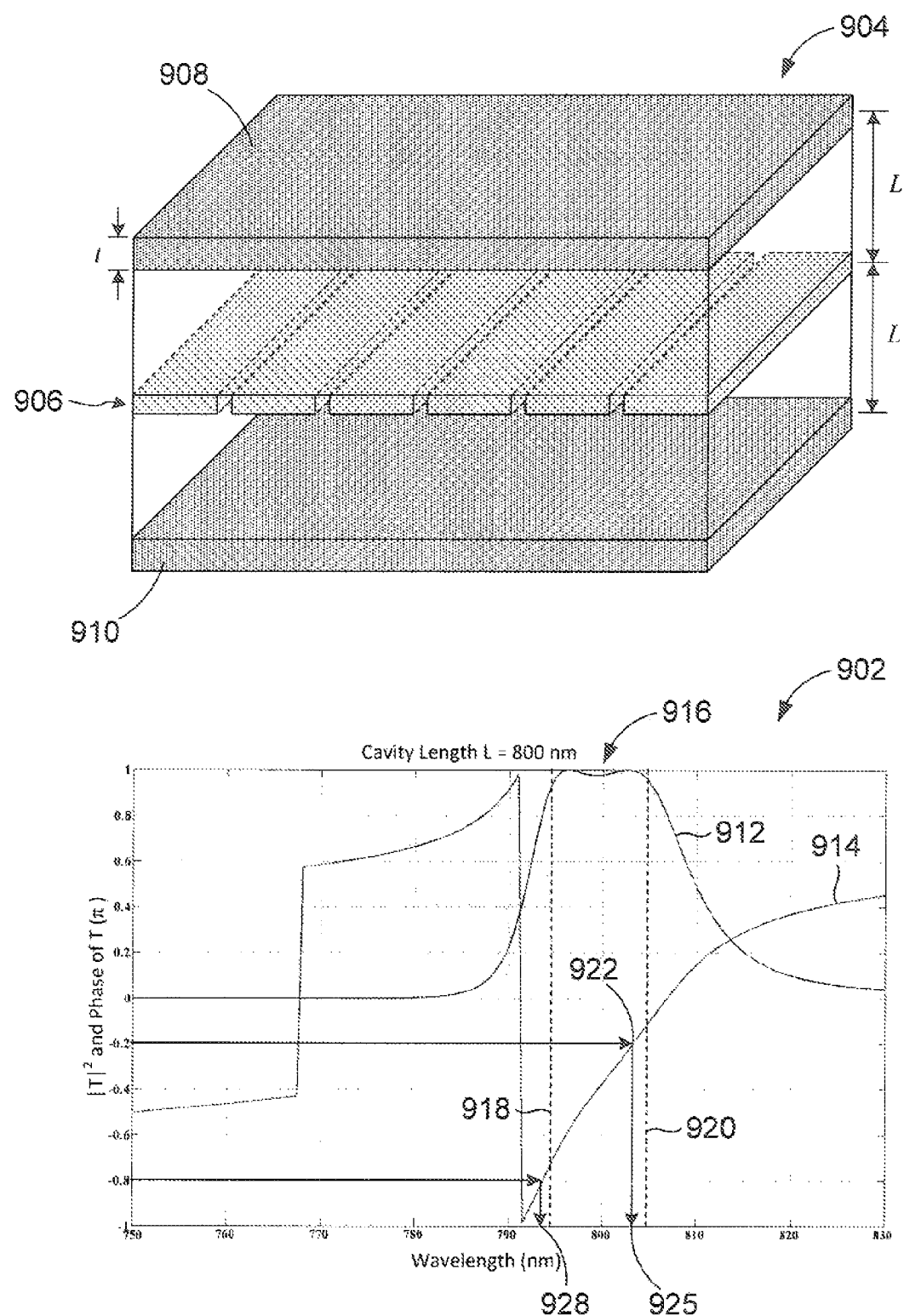
FIG. 9 shows a plot of transmittance and phase shift for an optical device over a range of wavelengths in accordance with one or more embodiments of the present invention.

An OFC can be designed to introduce a desired phase front for transmitted light in a number of ways. A first method for configuring the SWG layer includes determining a transmission profile for an OFC. The transmission coefficient for an OFC is a complex valued function represented by:

$$T(\lambda) = \sqrt{T_p(\lambda)} e^{i\phi(\lambda)}$$

where $T_p(\lambda)$ is the power transmittance of the OFC, and $\phi(\lambda)$ is the phase shift or change produced by the OFC. FIG. 9 shows a plot 902 of transmittance and phase shift simulation results over a range of incident light wavelengths for an OFC 904 including a SWG layer 906 in accordance with embodiments of the present invention. For the OFC 904, the cavity length L is 800 nm and the thickness t of the reflective structures is 280 nm. The reflective structures 908 and 910 have a refractive index of 3.48, and the SWG layer 906 has a refractive index of 3.2 and a one-dimensional grating pattern with a duty cycle of 0.45. The OFC 904 is operated at normal incidence with the electric field polarized substantially perpendicular to the lines comprising the SWG layer 906. In plot 902, curve 912 corresponds to the transmittance $T(\lambda)$ and curve 914 corresponds to the phase shift $\phi(\lambda)$ produced by the OFC 904 for the incident light over the wavelength range of approximately 750 nm to approximately 830 nm. The transmittance and phase curves 912 and 914 represent expected operation of the OFC 904 and can be obtained using either the application "MIT Electromagnetic Equation Propagation" ("MEEP") simulation package to model electromagnetic systems (ab-initio.mit.edu/meep/meep-1.1.1.tar.gz), or COMSOL Multiphysics® which is a finite element analysis and solver software package that can be used to simulate various physics and engineering applications (see, www.comsol.com). Curve 912 reveals a broad spectral region of high transmittance 916. However, curve 914 reveals that the phase of the reflected light varies across the entire high-reflectivity spectral region between dashed-lines 918 and 920.

The plot 902 can be used to uniformly adjust geometric parameters of the entire OFC in order to produce a desired change in the transmitted wavefront. When the spatial dimensions of the entire OFC are changed uniformly by a factor $\alpha$, the transmission coefficient profile remains substantially unchanged, but with the wavelength axis scaled by the factor $\alpha$. In other words, when an OFC has been designed with a particular transmission coefficient $T_0$ at a free space wavelength $\lambda_0$, a new OFC with the same transmission coefficient at a different wavelength $\lambda$ can be designed by multiplying the OFC geometric parameters, such as the cavity length, line period spacing, line thickness, and line width, by the factor $\alpha=\lambda/\lambda_0$, giving $T(\lambda)=T_0(\lambda/\alpha)=T_0(\lambda_0)$.

In addition, an OFC can be designed so that the OFC has a $|T(\lambda)| \rightarrow 1$, but with a spatially varying phase and for a fixed resonator length, by scaling the parameters of the OFC within the high-transmission spectral window 916. Suppose that introducing a phase $\phi(x, y)$ to light transmitted through a point of an OFC with transverse coordinates (x, y) is desired. Near the point (x, y) a nonuniform grating with a slowly varying scale factor $\alpha(x, y)$ behaves locally as though the OFC was configured with a periodic grating with a transmission coefficient $T_0(\lambda/\alpha)$. Thus, for an OFC with a certain resonator cavity length L and periodic grating design with a phase $\phi_0$ at some wavelength $\lambda_0$, choosing a local scale factor $\alpha(x, y)=\lambda/\lambda_0$ gives $\phi(x, y)=\phi_0$ at the operating wavelength $\lambda$. For example, suppose that introducing a phase of approximately $-0.2 \pi$ on a portion of the light transmitted through a point (x, y) on an OFC is desired, but current design of the OFC introduces a phase of approximately $-0.8 \pi$. Referring to the plot 902, the desired phase $\phi_0=-0.2 \pi$ corresponds to the point 922 on the curve 914 and the wavelength $\lambda_0 \approx 803$ nm 925, and the phase $-0.8\pi$ associated with the point (x, y) corresponds to the point 926 on the curve 914 and the wavelength $\lambda \approx 794$ nm. Thus the scale factor is $\alpha(x, y)=\lambda/\lambda_0=794/803=0.989$, and the geometric dimension of the OFC, such as the cavity length L, the thickness of the slabs 908 and 910 t, the thickness, line period spacing, and line width of the grating 906 at the point (x, y) can be adjusted by multiplying each of these parameters by the factor $\alpha$ in order to obtain the desired transmission phase $\phi_{()}=-0.2 \pi$ at the point (x, y) for the operating wavelength $\lambda \approx 794$ nm.

Figure 10:
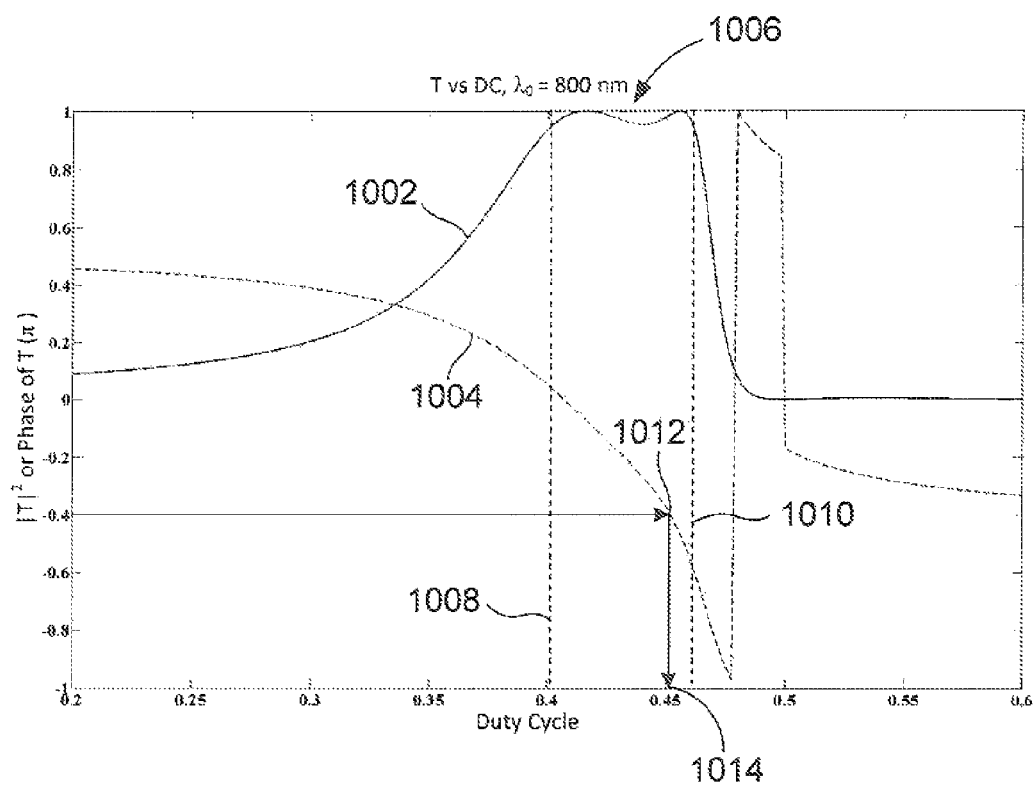
FIG. 10 shows a plot of transmittance and phase shift as a function of duty cycle for a sub-wavelength grating layer in accordance with one or more embodiments of the present invention.

The plot of transmittance and phase shift versus a range of wavelengths shown in FIG. 9 represents one way in which parameters of an OFC can be selected in order to introduce a particular phase to light transmitted through a particular point of the OFC. In certain embodiments, producing a desired phase variation in transmitted light through an OFC can be accomplished by changing the duty cycle of the SWG layer without also adjusting the cavity length L and thickness t of the slabs. FIG. 10 shows a plot of transmittance and phase shift as a function of variations in the duty cycle of a SWG layer for light with a wavelength of approximately 800 nm. The OFC is operated at normal incidence with the electric field polarized substantially perpendicular to the lines comprising the SWG layer. In FIG. 10, curve 1002 corresponds to the transmittance $T(\lambda)$ and curve 1004 corresponds to the phase shift $\phi(\lambda)$ produced by the OFC for the incident light with the wavelength of approximately 800 nm over a range of duty cycles from approximately $0.2 \pi$ to approximately $0.6 \pi$. The transmittance and phase curves 1002 and 1004 can be determined using either MEEP or COMSOL Multiphysics®.

Curve 1002 reveals a broad spectral region of high transmittance 1006. However, curve 1004 reveals that the phase of the transmitted light varies across the entire high transmittance region 1006 between dashed-lines 1008 and 1010 as a function of the duty cycle of the SWG layer. Thus, an OFC can be operated to transmit light with the wavelength 800 nm, with a high transmittance 1006, and with a desired phase shift by configuring a region of the SWG layer with a duty cycle corresponding to the desired phase shift based on the curve 1004. For example, suppose that it is desired to transmit light through a particular region of the OFC with a phase shift of $-0.4 \pi$. A phase shift of $-0.4 \pi$ corresponds to a point 1012 on the curve 1004 and to a duty cycle of 0.451 (1014). Thus, in order to introduce the phase shift of $-0.4 \pi$ to light transmitted through this region, the corresponding region of the SWG layer alone can be configured with the duty cycle of 0.451 (1014).

Figure 11:
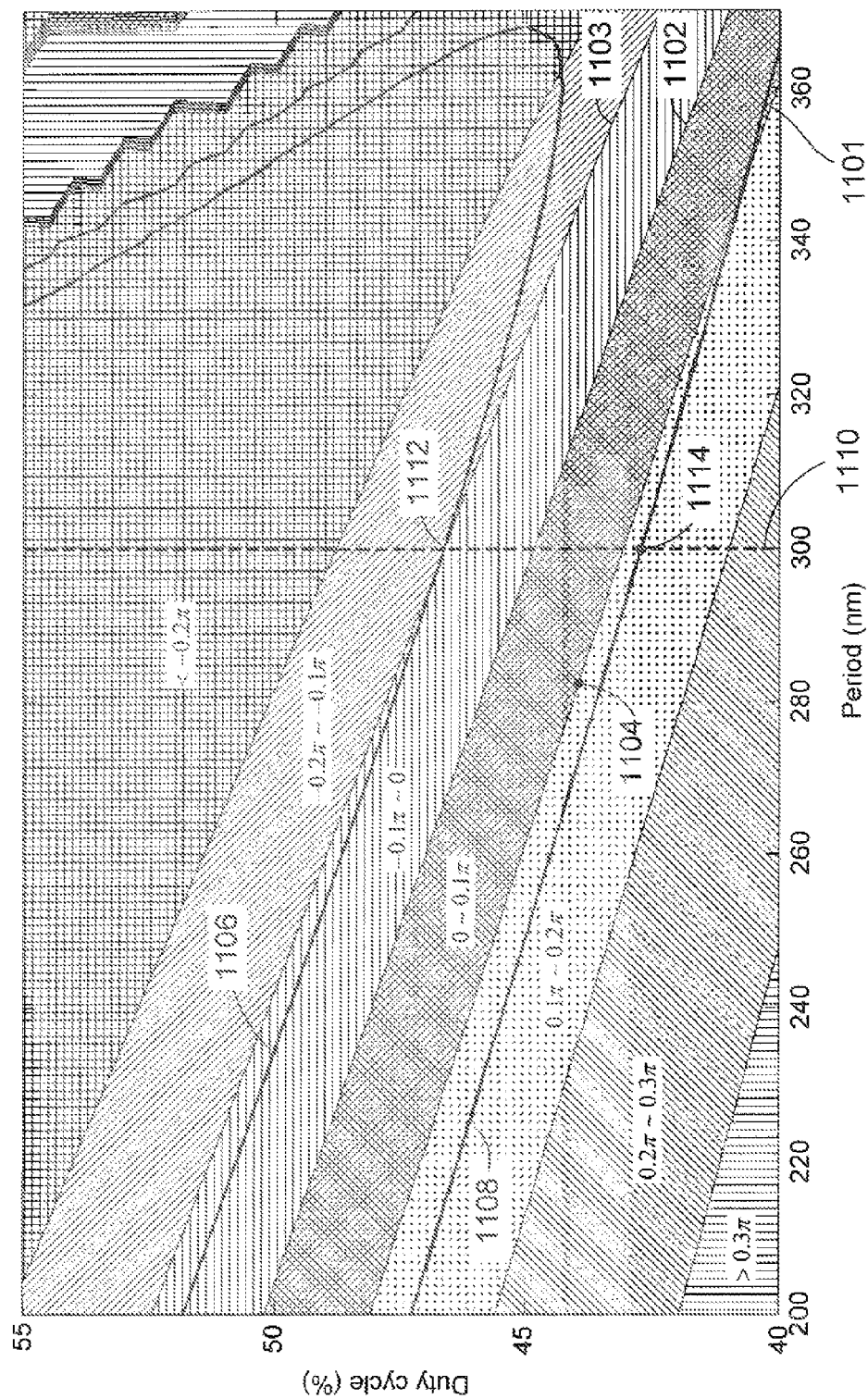
FIG. 11 shows a contour plot of phase shift variation as a function of period and duty cycle obtained in accordance with one or more embodiments of the present invention.

In still other embodiments, variations in the phase of light transmitted through an OFC can be accomplished as a function of line period spacing and duty cycle of the SWG layer of the OFC without adjusting the cavity length L and slab thickness t. FIG. 11 shows a contour plot of phase variation as a function of period and duty cycle obtained in accordance with embodiments of the present invention using either MEEP or COMSOL Multiphysics®. Contour lines, such as contour lines 1101-1103, each correspond to a particular phase acquired by light transmitted through an OFC with the SWG layer configured with a period and duty cycle lying anywhere along the contour. The phase contours are separated by $0.1 \pi$ rad. For example, contour 1101 corresponds to periods and duty cycles that apply a phase of $0.1\pi$ rad to transmitted light. Phases between $0.1 \pi$ rad and 0.0 rad are applied to light transmitted through a region of an OFC where the SWG layer has periods and duty cycles that lie between contours 1101 and 1102. A point (p, $\eta$) 1104 corresponds to a grating period of 280 nm and 44% duty cycle. A sub-region of the SWG layer with a period and duty cycle corresponding to the point 1104 introduces the phase $\phi=0.1 \pi$ rad to light transmitted through the sub-region of the OFC. FIG. 11 also includes two transmission contours 1106 and 1108 for 95% transmission overlain on the phase contour surface. Points (p, $\eta$, $\phi$) that lie anywhere between the contours 1106 and 1108 have a minimum transmission of 95%.

The points (p, $\eta$, $\phi$) represented by the phase contour plot can be used to select periods and duty cycles for a SWG layer of an OFC that can be operated as a particular type of lens with a minimum transmission, as described below in the next subsection. In other words, the data represented in the phase contour plot of FIG. 11 can be used to configure the grating sub-patterns of a SWG layer of an OFC so that the OFC can be operated to inject light into the core of an optical fiber or can be operated like a lens for light exiting the optical fiber. In certain embodiments, the period or duty cycle can be fixed while the other parameter is varied to configure the SWG layer. In other embodiments, both the period and duty cycle can be varied to configure the SWG layer.

Figure 12:
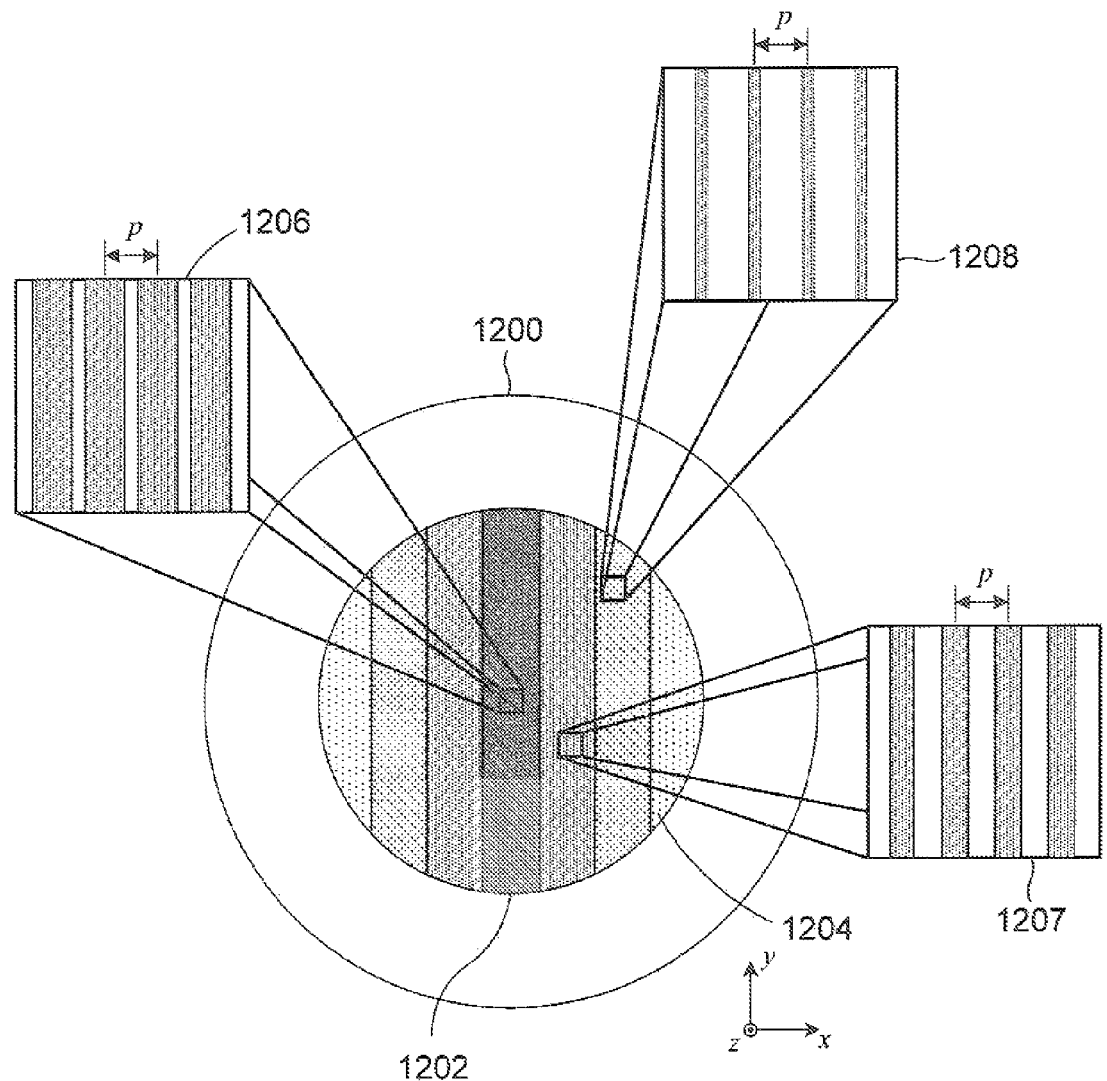
FIG. 12 shows a top plan view of a non-periodic, sub-wavelength grating configured to operate as a convex lens for polarized incident light in accordance with one or more embodiments of the present invention.

In certain embodiments, the SWG layer can be configured so that the OFC can be operated as a convex lens for focusing polarized light transmitted into or out of the core of an optical fiber. In the following example, changes in the duty cycle are achieved by varying the line width of the NP-SWG while holding the period constant. FIG. 12 shows a top plan-view of a SWG layer 1200 with a one-dimensional grating configured so that an OFC can be operated as a convex lens for incident light polarized substantially parallel to the x-direction in accordance with one or more embodiments of the present invention. Each shaded region of the NP-SWG represents a different grating sub-pattern of lines extending in the y-direction, with darker shaded regions, such as region 1202, representing regions with a relatively larger duty cycle than lighter shaded regions, such as region 1204. FIG. 12 includes enlargements 1206-1208 of three sub-regions revealing that the lines run parallel in the y-direction and the line period spacing p is constant or fixed in the x-direction. Enlargements 1206-1208 also reveal that the line width w, in other words the duty cycle η, decreases away from the center in the x-direction. The SWG layer 1200 is configured so that light of an appropriate wavelength and polarized in the x-direction (i.e., single mode) is transmitted through the OFC and is focused at a focal point located either inside or outside of the optical fiber, as described above with reference to FIGS. 7 and 8.

Figure 13:
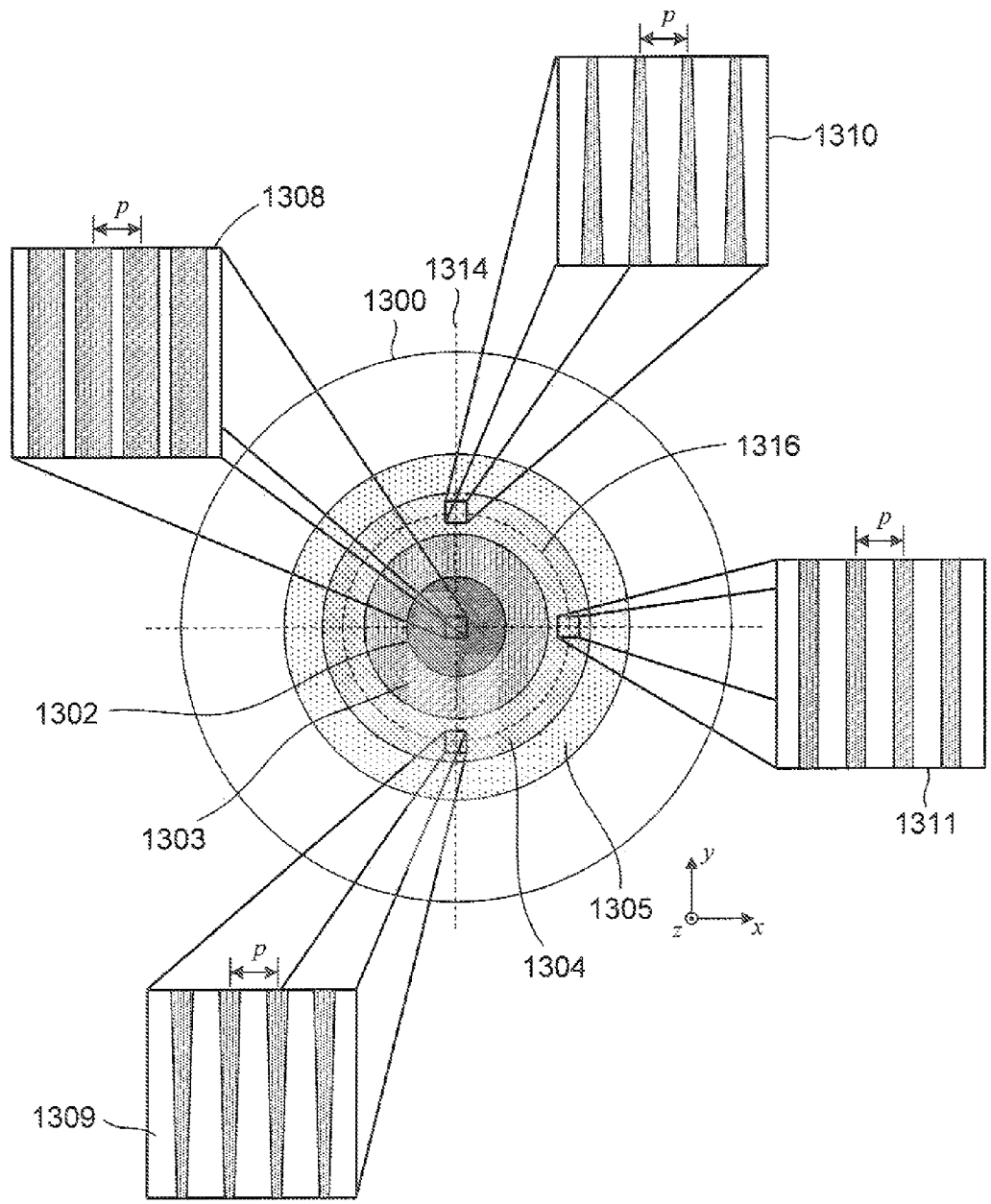
FIG. 13 shows a top plan view of a non-periodic, sub-wavelength grating configured to operate as a convex lens for non-polarized incident light in accordance with one or more embodiments of the present invention.

In certain embodiments, the SWG layer can be configured so that the OFC can be operated as a convex lens for focusing incident light polarized in any direction into an optical fiber core by appropriately tapering the lines of the NP-SWG away from the center of the SWG-layer. FIG. 13 shows a top plan view of a one-dimensional grating pattern of a SWG layer 1300 configured so that an OFC can be operated as a convex lens for incident light polarized in any direction in accordance with one or more embodiments of the present invention. The SWG layer 1300 includes a NP-SWG with a grating pattern represented by annular shaded regions 1302-1305. Each shaded annular region represents a different grating sub-pattern of lines. Enlargements 1308-1311 show that the NP-SWG comprises lines tapered in the y-direction with a constant line period spacing p in the x-direction. In particular, enlargements 1308-1310 are enlargements of the same lines running parallel to dashed-line 1314 in the y-direction. Enlargements 1308-1310 reveal that the line period spacing p remains constant but the width of the lines narrow or taper away from the center of the NP-SWG in the y-direction. Each annular region has the same duty cycle and period. For example, enlargements 1309-1311 reveal portions of the annular region 1304 comprising portions of different lines that have substantially the same duty cycle. As a result, each portion of an annular region produces the same approximate phase shift in the light transmitted through the OFC. For example, dashed circle 1316 represents a single phase shift contour in which light transmitted through the OFC anywhere along the circle 1316 acquires substantially the same phase φ.

Figure 14:
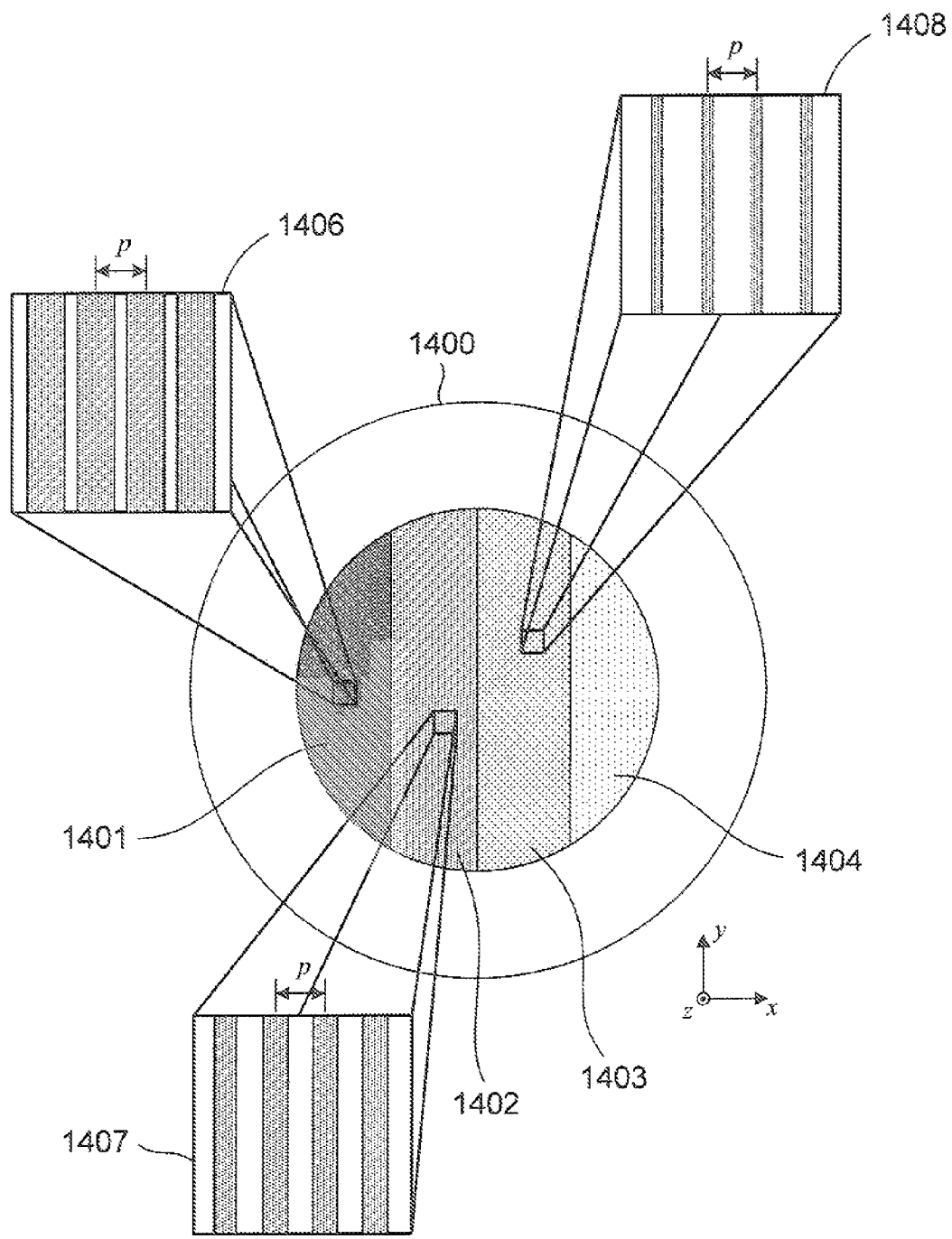
FIG. 14 shows a top plan view of a non-periodic, sub-wavelength grating configured to operate as a prism for polarized incident light in accordance with one or more embodiments of the present invention.

Embodiments of the present invention are not limited to optical devices configured to operate as convex lenses. In other embodiments, the NP-SWG layer can be configured to provide arbitrary phase front shape modulation. In certain embodiments, the NP-SWG of a SWB layer can be configured so that the OFC operates like a prism with transmitted light directed away from the surface normal of the OFC. FIG. 14 shows a top plan view of a one-dimensional grating pattern of a SWG layer 1400 configured so that an OFC can be operated as a prism for normal incident light of an appropriate wavelength and polarized in the x-direction in accordance with one or more embodiments of the present invention. The NP-SWG of the SWG layer 1400 includes regions 1401-1404, with each region formed from lines extending in the y-direction, having the same period, but with the duty cycle progressively decreasing from the region 1401 to the region 1404. Enlargements 1406-1408 reveal that line period spacing p is the same throughout, but the lines of region 1401 have a relatively larger duty cycle than the lines of region 1402, which have a larger duty cycle than the lines of region 1403. The duty cycles for the regions 1401-1404 are selected so that the resulting phase change in transmitted light is largest for the region 1401 and decreases from the region 1401 to the region 1404. The phase change causes incident light polarized in the x-direction and directed normal to the OFC to be transmitted with an angle θ away from the surface normal, as described above with reference to FIG. 8D.

Figure 15A:
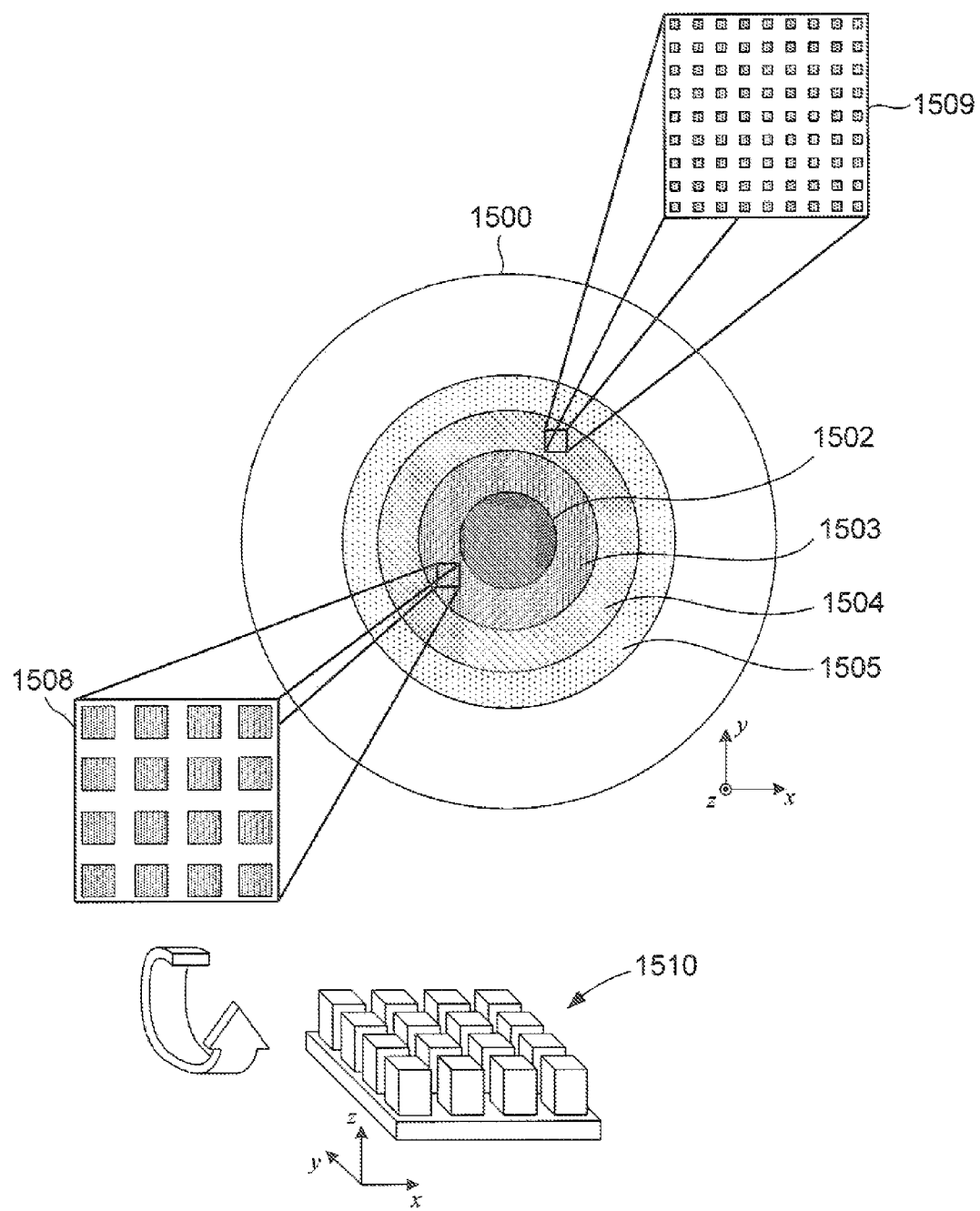
FIGS. 15A-15B show top plan views of example two-dimensional grating patterns of a non-periodic, sub-wavelength grating layer configured in accordance with one or more embodiments of the present invention.
Figure 15B:
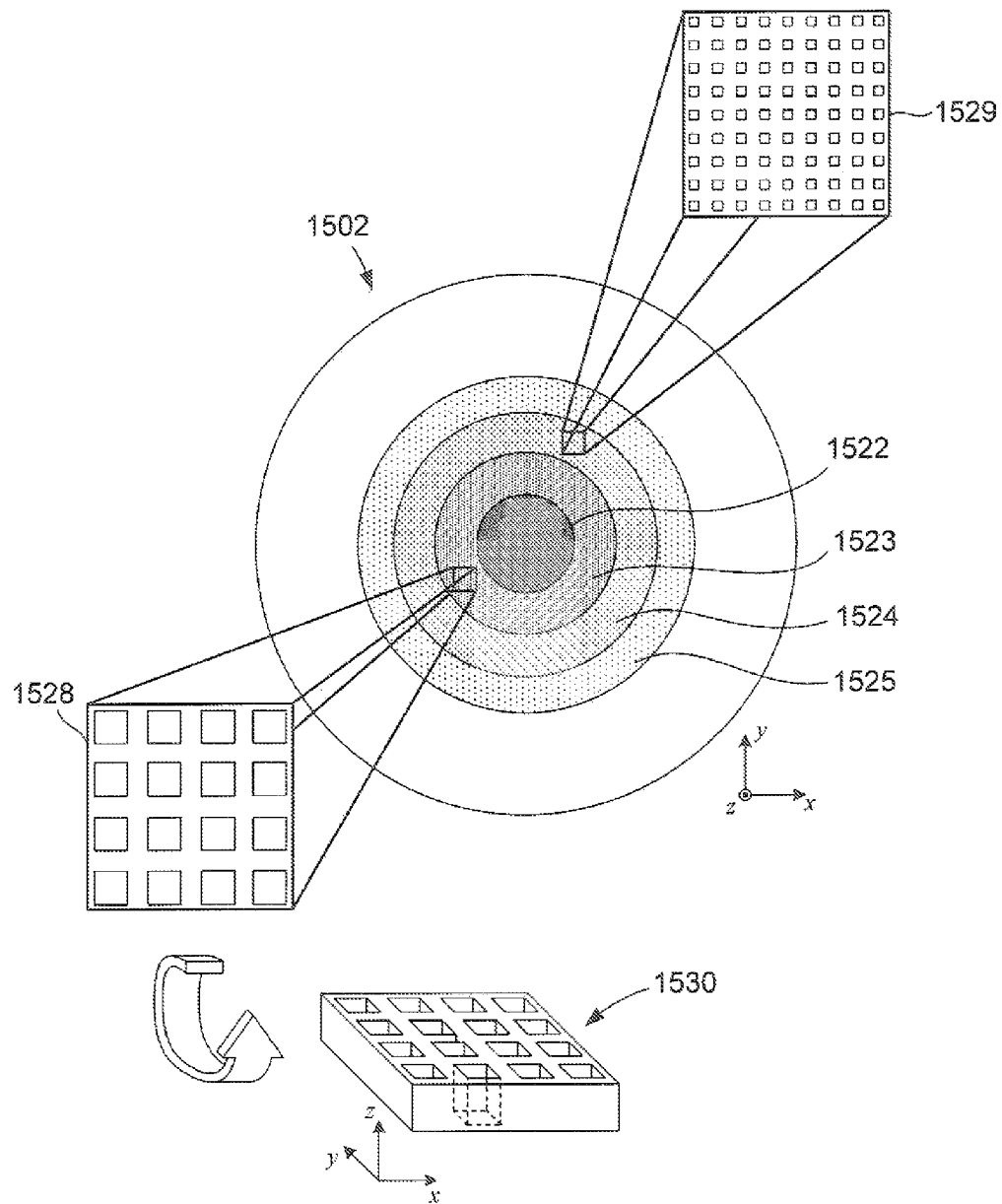

Embodiments of the present invention are not limited to one-dimensional gratings. The SWG layer can be configured as a two-dimensional NP-SWG so that the OFC can be operated as a convex lens for focusing incident unpolarized light in any direction transmitted into or out of an optical fiber core. FIGS. 15A-15B show top plan views of two examples of two-dimensional grating patterns configured so that an OFC can be operated as a convex lens for incident unpolarized light in accordance with one or more embodiments of the present invention. In the example of FIG. 15A, the NP-SWG is composed of posts rather lines separated by grooves. The duty cycle and period can be varied in the x- and y-directions. The SWG layer 1500 includes a NP-SWG with a grating pattern represented by annular shaded regions 1502-1505. Each shaded annular region represents a different grating sub-pattern of posts. Enlargements 1508 and 1509 show two different size posts, where the size of the posts decreasing away from the center of the NP-SWG. FIG. 15A includes an isometric view 1510 of posts comprising the enlargement 1508. Although the posts shown in FIG. 15B are square shaped, in other embodiments, the posts can be rectangular, circular, or elliptical shaped. In the example of FIG. 15B, the NP-SWG is composed of holes rather posts. The SWG layer 1520 includes a NP-SWG with a grating pattern represented by annular shaded regions 1522-1525. Each shaded annular region represents a different grating sub-pattern of holes. Enlargements 1528 and 1529 show two different size holes, where the size of the holes decreasing away from the center of the NP-SWG. FIG. 15B includes an isometric view 1530 of holes comprising the enlargement 1528. Although the holes shown in FIG. 15B are square shaped, in other embodiments, the holes can be rectangular, circular, or elliptical.

Fabricating Optical Fiber Couplers

The OFCs can be fabricated using deposition and lithographic techniques. FIGS. 16A-16C show steps of a method for fabricating an OFC on the end of an optical fiber 1602 in accordance with one or more embodiments of the present invention. Initially, the end of the optical fiber can be planarized using chemical mechanical polishing. In FIG. 16A, a first reflective layer 1604 is deposited directly on the end of the nanowire 1602 using wafer bonding, chemical vapor deposition ("CVD"), or physical vapor deposition ("PVD"). A first spacer layer 1606 can then be deposited on the reflective layer 1604 using spin-on glass, CVD, or PVD. Next, as shown in FIG. 16B, a SWG layer 1608 is deposited on the surface of the spacer layer 1606 using wafer bonding, CVD, of PVD. A NP-SWG 1610 is formed in the SWG layer 1608 using reactive ion etching ("RIE"), focused ion beam milling ("FIB"), nanoimprint lithography, or any other suitable technique for forming a non-periodic, sub-wavelength grating pattern in the SWG layer 1608. The layers 1604, 1606, and 1608 form a first resonant cavity. Next, as shown in FIG. 16C, a second spacer layer 1612 is deposited over the SWG layer 1608 using spin-on glass, CVD, or PVD followed by deposition of a second reflective layer 1614 using CVD or PVD. The layers 1608, 1610, and 1612 form a second resonant cavity.

In other embodiments, the OFC can be prefabricated and placed on the end of the optical fiber. FIGS. 17A-17E show steps of a method for pre-fabricating an OFC and placing the OFC on the end of an optical fiber 1602 in accordance with one or more embodiments of the present invention. In FIG.

Figure 17A:
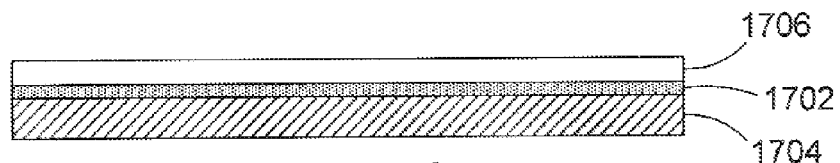
FIGS. 17A-17E show steps of a method for pre-fabricating an optical fiber coupler and placing the optical fiber coupler on the end of an optical fiber in accordance with one or more embodiments of the present invention.
Figure 17B:
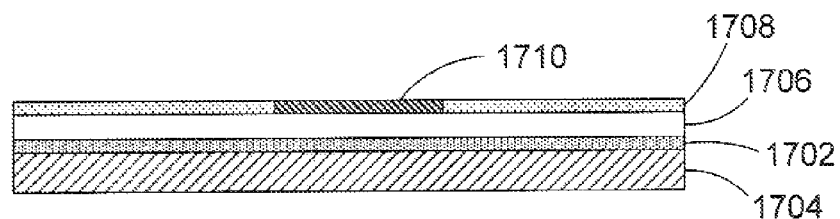
Figure 17C:
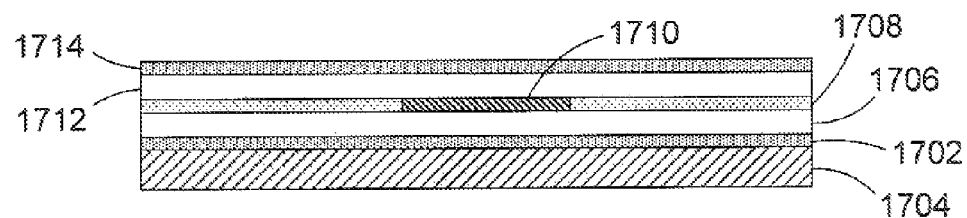
Figure 17D:
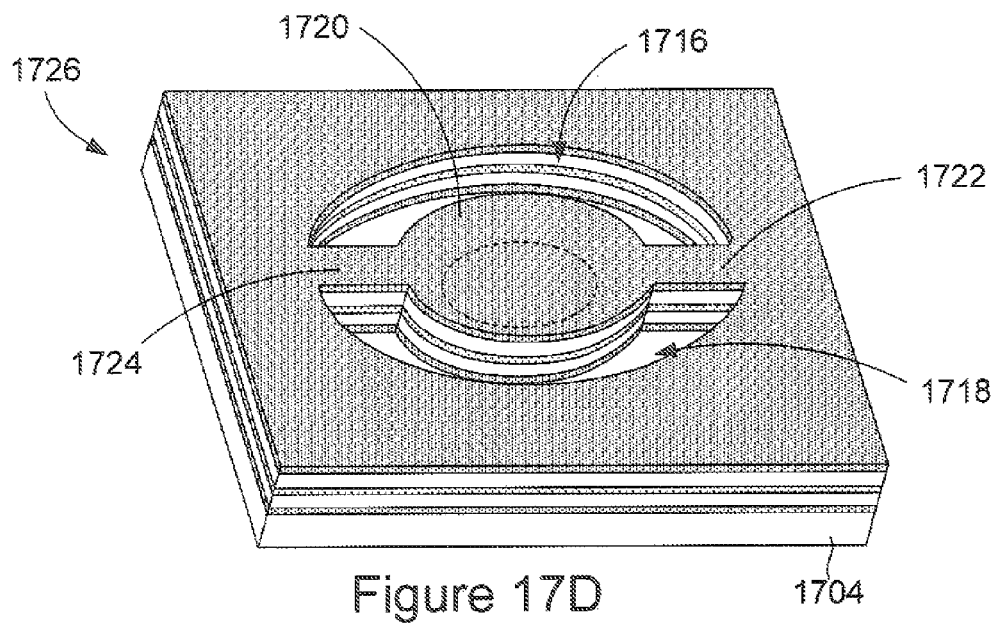
Figure 17E:
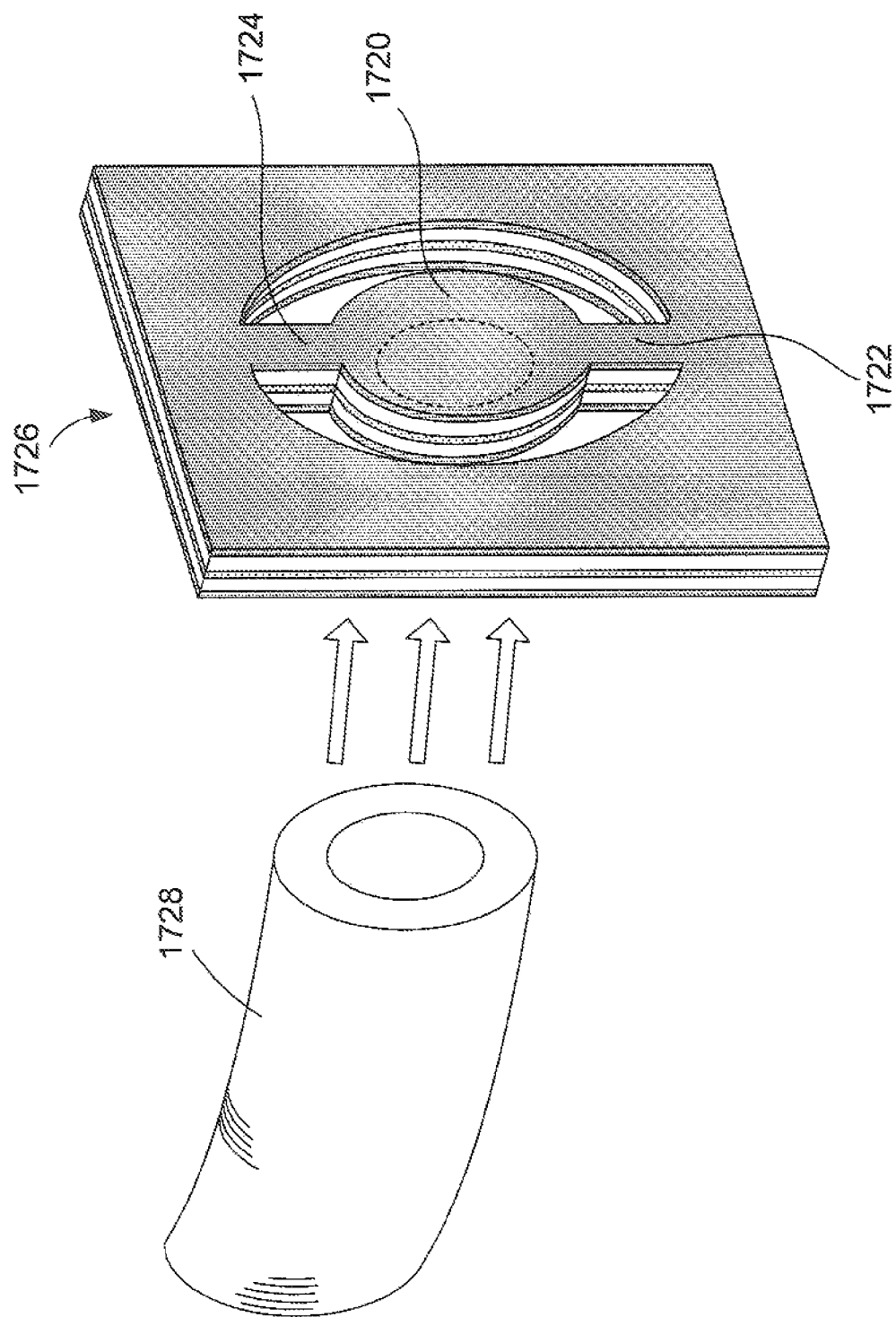

17A, a first reflective layer 1702 is deposited on substrate 1704, such as SiO$_2$ substrate, using wafer bonding, CVD, or PVD followed by deposition of a spacer layer 1706 using spin-on glass, CVD, or PVD. Next, as shown in FIG. 17B, a SWG layer 1708 is deposited on the surface of the spacer layer 1706 using wafer bonding, CVD, or PVD. A NP-SWG 1710 is formed in the SWG layer 1708 using RIE, FIB, nanoimprint lithography, or any other suitable technique for forming a non-periodic, sub-wavelength grating pattern in the SWG layer 1708. Next, as shown in FIG. 17C, a second spacer layer 1712 is deposited over the SWG layer 1608 using spin-on glass, CVD, or PVD followed by deposition of a second reflective layer 1714, both layer deposited using wafer bonding, CVD, or PVD. Next, as shown in the isometric view of FIG. 17D, crescent-shaped holes 1716 and 1718 are created in and extending through the layers 1702, 1706, 1708, 1710, 1712, and 1714 to the substrate using RIE or FIB. The crescent-shaped holes 1716 and 1718 define an OFC 1720 supported by finger-like support structures 1722 and 1724 of a carrier wafer 1726. Next, using lift off, the carrier wafer 1726 is separated from the substrate 1704, and as shown in FIG. 17E, the end of an optical fiber 1728 is aligned with the OFC 1720 of the carrier wafer 1726 and the optical fiber 1728 is attached to the OFC 1720 using an adhesive or using anodic bonding. The fingers-like structures 1722 and 1724 are cut leaving the OFC 1720 attached to the end of the optical fiber 1728.

Figure 18:
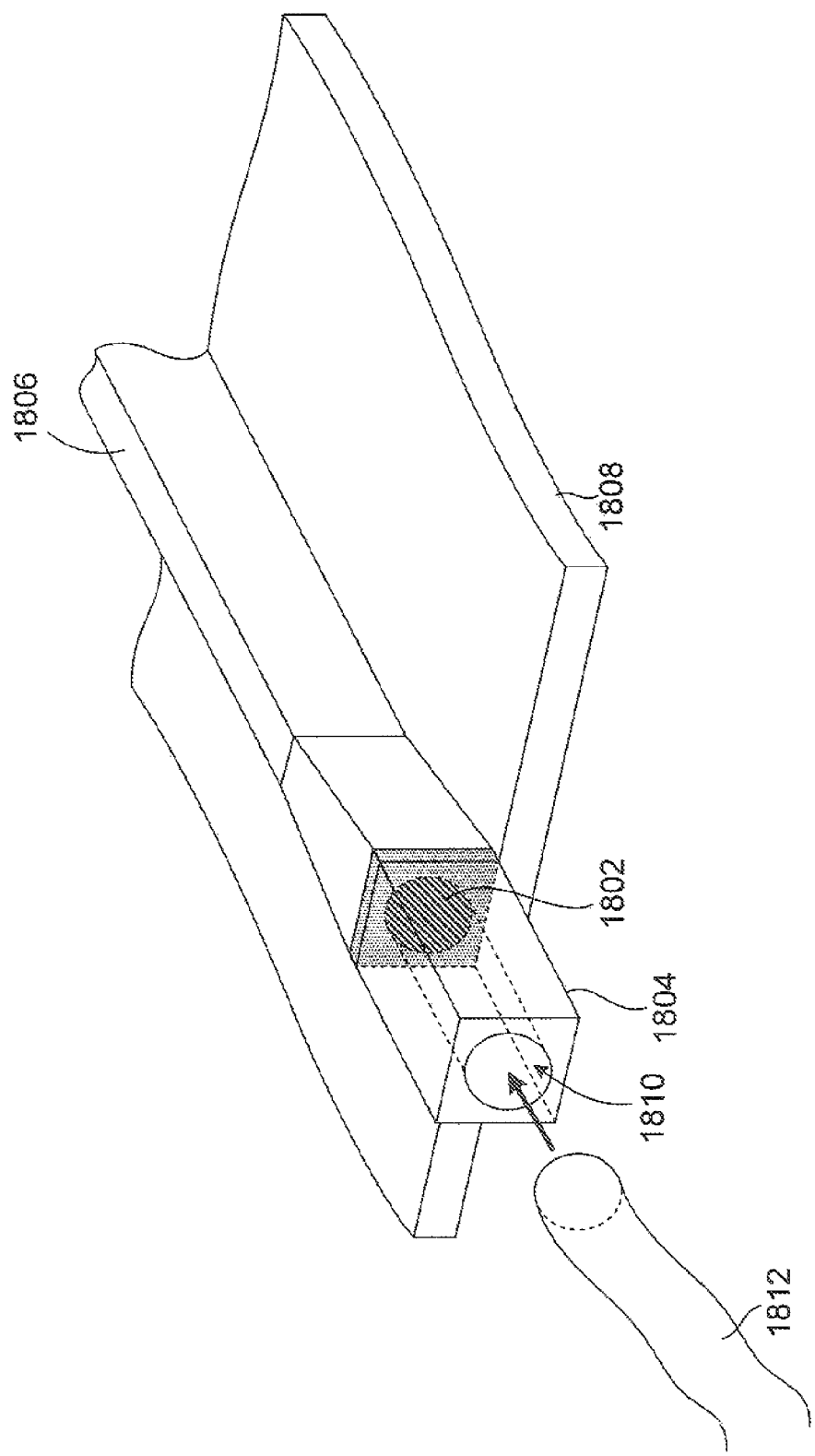
FIG. 18 shows an optical fiber coupler disposed between a fiber support structure and an optical waveguide in accordance with one or more embodiments of the present invention.

In other embodiments, an optical fiber can be attached to the OFC using an optical fiber support system. FIG. 18 shows an OFC 1802 disposed between a fiber support system 1804 and a tapered end-portion of an optical waveguide 1806 in accordance with one or more embodiments of the present invention. The optical waveguide 1806 is disposed on the surface of a substrate 1808, which can be a circuit board or chip. The fiber support system 1804 includes a cylindrical-shaped opening 1810. An optical fiber 1812 inserted into the opening 1810 is held adjacent to the OFC 1802 by the support system 1804. The OFC 1802 can be formed as a wafer using the methods described above with reference to FIGS. 16 and 17, and the wafer adhered to the end portion of the waveguide 1806 and the support structure 1804 using an adhesive or anodic bonding.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical fiber coupling system comprising:
a first resonant cavity abutting the end of an optical fiber including a core;
a second resonant cavity located adjacent to the first cavity, the first and second resonant cavities separated by a sub-wavelength grating layer configured with a non-periodic sub-wavelength grating, wherein the optical fiber coupling system selectively couples light into and/or out of the optical fiber core.

2. The system of claim 1 wherein the first cavity further comprises:
a first reflective layer disposed on the end of the optical fiber; and
a first spacer layer disposed between the first reflective layer and the sub-wavelength grating layer, the first spacer layer having a lower refractive index than the first reflective layer and the sub-wavelength grating layer.

3. The system of claim 1 wherein the second cavity further comprises:
a second spacer layer disposed on the sub-wavelength grating layer; and
a second reflective layer disposed on the second spacer layer, the second spacer layer having a lower refractive index than the second reflective layer and the sub-wavelength grating layer.

4. The system of claim 1 wherein the optical fiber further comprises a single mode optical fiber.

5. The system of claim 1 wherein the optical fiber further comprises a multimode optical fiber.

6. The system of claim 1 wherein the non-periodic, sub-wavelength grating further comprises a one-dimensional non-periodic, sub-wavelength grating including substantially parallel lines separate by grooves.

7. The system of claim 6 wherein the one-dimensional non-periodic, sub-wavelength grating is configured to transmit and focus the component of incident light polarized perpendicular to the lines of the grating into the core of the optical fiber.

8. The system of claim 6 wherein the one-dimensional non-periodic, sub-wavelength grating is configured to transmit and focus the component of light carried by the optical fiber and polarized perpendicular to the lines of the grating onto a focal point located outside the optical fiber.

9. The system of claim 1 wherein the non-periodic, sub-wavelength grating further comprises a one-dimensional non-periodic, sub-wavelength grating including substantially parallel and tapered lines separate by grooves.

10. The system of claim 9 wherein the one-dimensional non-periodic, sub-wavelength grating is configured to transmit and focus unpolarized incident light into the core of the optical fiber.

11. The system of claim 9 wherein the one-dimensional non-periodic, sub-wavelength grating is configured to transmit and focus unpolarized incident light carried by the optical fiber onto a focal point located outside the optical fiber.

12. The system of claim 1 wherein the non-periodic, sub-wavelength grating further comprises a two-dimensional non-periodic, sub-wavelength grating.

13. The system of claim 1 wherein the optical fiber coupling system selectively couples light into and/or out of the optical fiber core and further comprises the optical coupling system configured to shape the wavefront of the light transmitted into and/or out the optical fiber system.

14. The system of claim 1 further comprises an optical fiber support system, wherein the support system includes an opening for inserting the optical fiber and disposing the optical fiber adjacent to the optical fiber coupling system.

15. A method for fabricating an optical fiber coupling system for coupling light into and/or out of an optical fiber, the method comprising:
depositing a first reflective layer on a substrate;
depositing a first spacer layer on the first reflective layer;
forming a sub-wavelength grating layer on the first spacer layer;

depositing a second spacer layer on a grating layer; and
depositing a second reflective layer on the second spacer layer, wherein the first and second spacer layers have lower refractive indices than the first and second reflective layers and the grating layer.

16. The method of claim 15 wherein the substrate further comprises a planarized end of an optical fiber.

17. The method of claim 15 further comprising forming two crescent-shaped holes extending through the layers of the optical fiber system, wherein the crescent-shaped holes define an optical fiber coupling system supported by two finger-like support structures.

18. The method of claim 17 further comprising attaching a planarized end of an optical fiber to the optical fiber coupling system using an adhesive.

19. The method of claim 17 further comprising attaching a planarized end of an optical fiber to the optical fiber coupling system using anodic bonding.

20. The method of claim 17 further comprising cutting the support structures leaving the optical fiber coupling system attached the end of the optical fiber.

* * * * *

UNITED STATES PATENT AND TRADEMARK OFFICE
CERTIFICATE OF CORRECTION

| | |
|---|---|
| PATENT NO. | : 8,265,435 B2 |
| APPLICATION NO. | : 12/696330 |
| DATED | : September 11, 2012 |
| INVENTOR(S) | : Kai-Mei Camilla Fu et al. |

It is certified that error appears in the above-identified patent and that said Letters Patent is hereby corrected as shown below:

In column 12, line 56, in Claim 13, delete "out" and insert -- out of --, therefor.

In column 14, line 9, in Claim 20, delete "attached" and insert -- attached to --, therefor.

Signed and Sealed this
Second Day of April, 2013

Teresa Stanek Rea
*Acting Director of the United States Patent and Trademark Office*